US008244184B2

(12) United States Patent
Namekata et al.

(10) Patent No.: US 8,244,184 B2
(45) Date of Patent: Aug. 14, 2012

(54) RADIO COMMUNICATION SYSTEM CAPABLE OF MAINTAINING COMMUNICATION PERFORMED BETWEEN MASTER STATION AND SLAVE STATION BELONGING TO SUCH MASTER STATION EVEN WHEN INTERFERENCE SIGNAL IS DETECTED

(75) Inventors: Minoru Namekata, Kawasaki (JP); Masahiro Sekiya, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1072 days.

(21) Appl. No.: 12/133,471

(22) Filed: Jun. 5, 2008

(65) Prior Publication Data

US 2008/0305817 A1 Dec. 11, 2008

(30) Foreign Application Priority Data

Jun. 6, 2007 (JP) ................................ 2007-150976

(51) Int. Cl.
*H04B 17/00* (2006.01)
(52) U.S. Cl. ............... 455/67.11; 455/67.14; 455/226.1; 375/140
(58) Field of Classification Search ............... 455/67.11, 455/67.14, 226.1, 127.4, 167.1; 370/329, 370/335; 375/140, 146
See application file for complete search history.

(56) References Cited

U.S. PATENT DOCUMENTS

| 7,206,332 B2* | 4/2007 | Kwan et al. | 375/140 |
| 7,386,277 B2* | 6/2008 | Cho et al. | 455/69 |
| 7,778,644 B2* | 8/2010 | Choi et al. | 455/450 |
| 8,023,450 B2* | 9/2011 | Abedi | 370/328 |
| 2007/0110000 A1* | 5/2007 | Abedi | 370/332 |
| 2007/0291692 A1* | 12/2007 | Choi et al. | 370/330 |
| 2009/0245408 A1* | 10/2009 | Mujtaba et al. | 375/267 |
| 2010/0103887 A1* | 4/2010 | Zhu et al. | 370/329 |
| 2010/0330899 A1* | 12/2010 | Hong et al. | 455/3.01 |
| 2011/0051666 A1* | 3/2011 | Kim et al. | 370/328 |

FOREIGN PATENT DOCUMENTS

| JP | 2006-80741 A | 3/2006 |
| JP | 2006-180321 A | 7/2006 |
| JP | 2006-211242 | 8/2006 |
| JP | 2007-49694 A | 2/2007 |

OTHER PUBLICATIONS

U.S. Appl. No. 12/196,564, filed Aug. 22, 2008, Sekiya, et al.

* cited by examiner

*Primary Examiner* — Minh D Dao
(74) *Attorney, Agent, or Firm* — Oblon, Spivak, McClelland, Maier & Neustadt, L.L.P.

(57) ABSTRACT

A radio communication system includes one master station which performs transmission without being controlled by another radio station and which is configured to independently set a channel for use in a radio communication, and at least one slave station which belongs to the one master station and whose radio communication channel used and transmission/reception operations are controlled by the master station. When detecting an interference signal which disturbs the radio communication during operation, the one master station or the at least one slave station sets a first modulation scheme applied to the radio communication to the same second modulation scheme as a modulation scheme used in broadcast in order to convey information necessary for an evasive action to move to another radio communication channel.

13 Claims, 14 Drawing Sheets

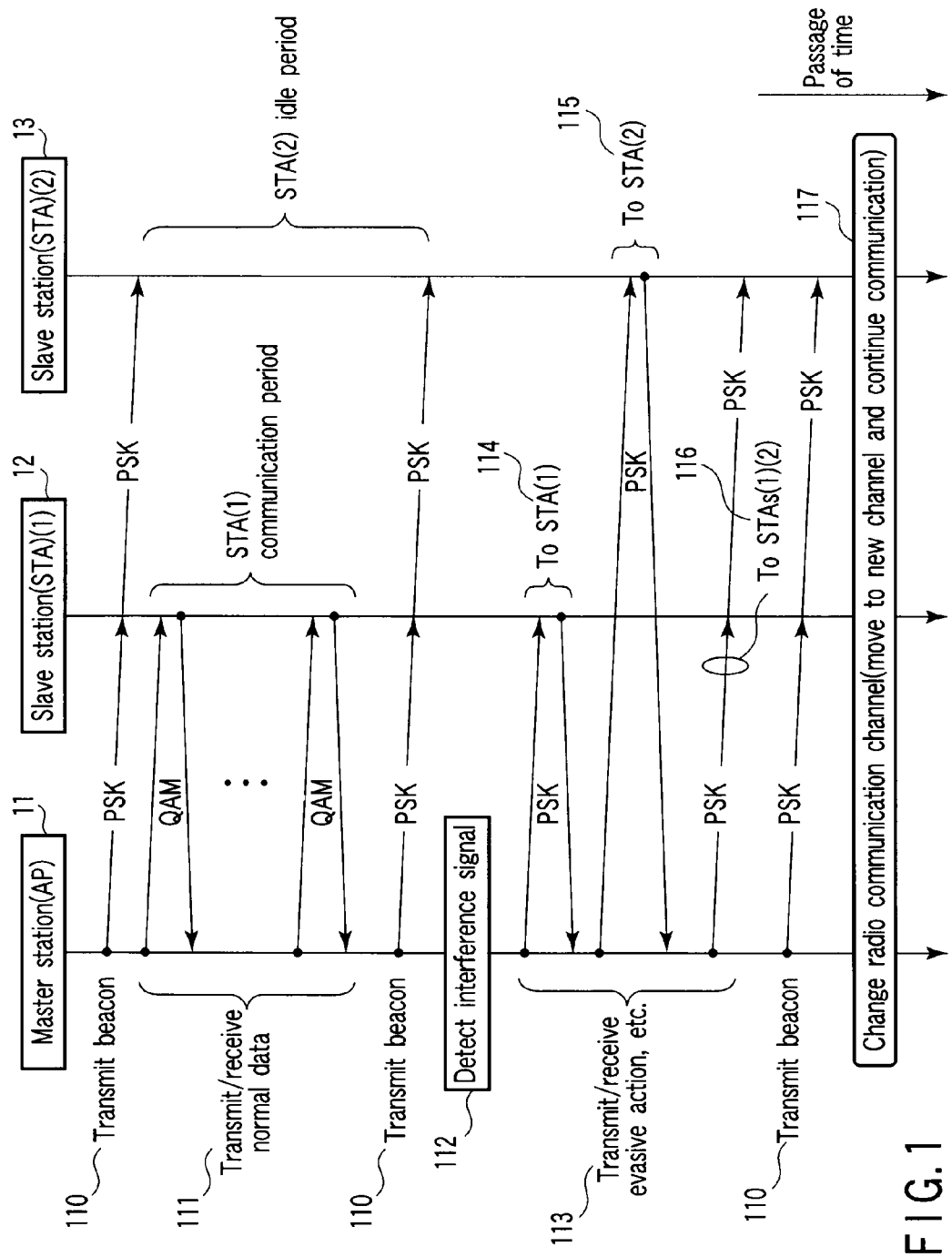
F I G. 1

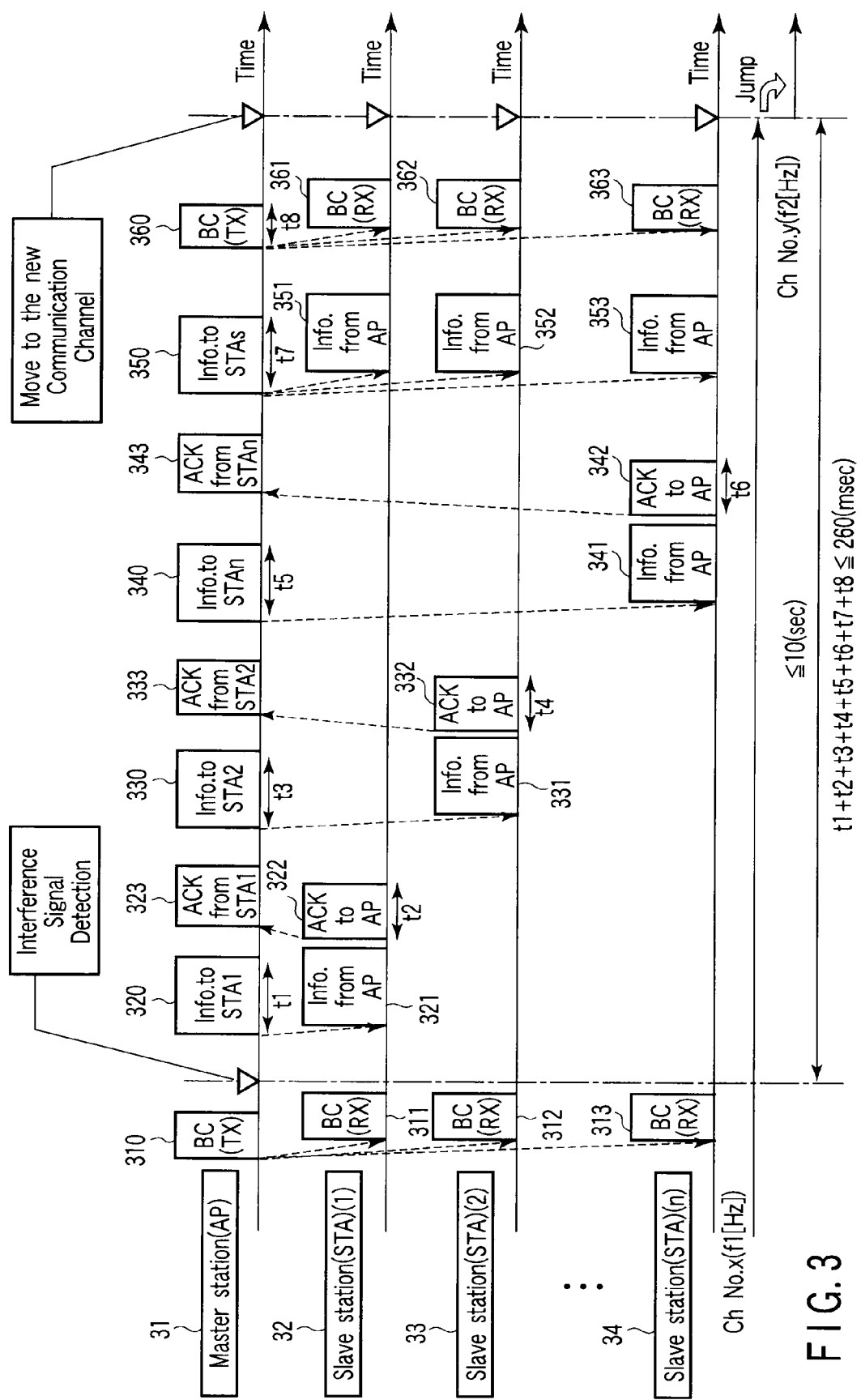

Example of radar waves when interference signal is radar wave

| Kind of Radars | Pulse Width W [µs] | Pulse Repetition Frequency PRF [pps] | Burst Length L /No. of pulses L [msec] | Burst Period B [sec] |
|---|---|---|---|---|
| Radar(1) | 1.0 | 700 | 25.7/18 | 10 |
| Radar(2) | 1.0 | 1800 | 5.56/10 | 2 |
| Radar(3) | 2.0 | 330 | 212.0/70 | 60 |
| Radar(4) | 2.5 | 260 | 69.2/18 | 15 |
| Radar(5) | 0.5 | 720 | 25.0/18 | 15 |
| Radar(6) | 2.0 | 250 | 72.0/18 | 15 |

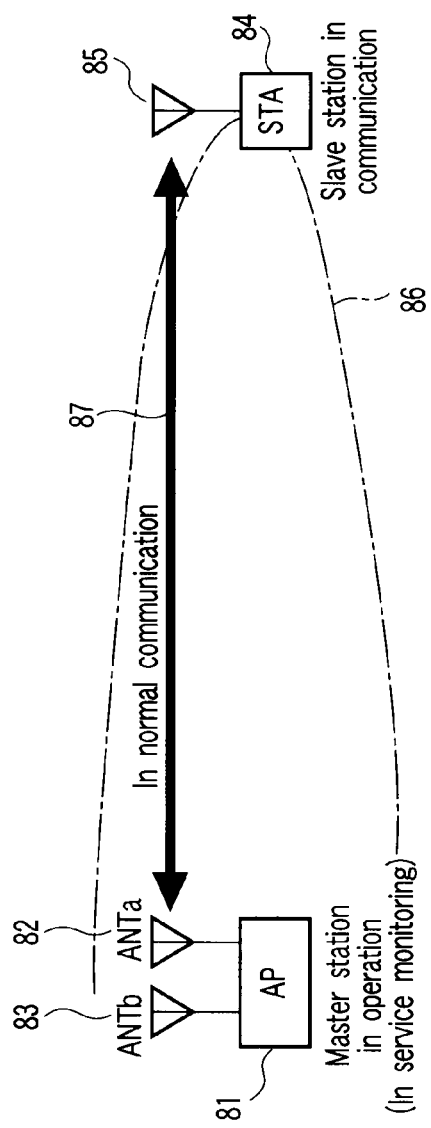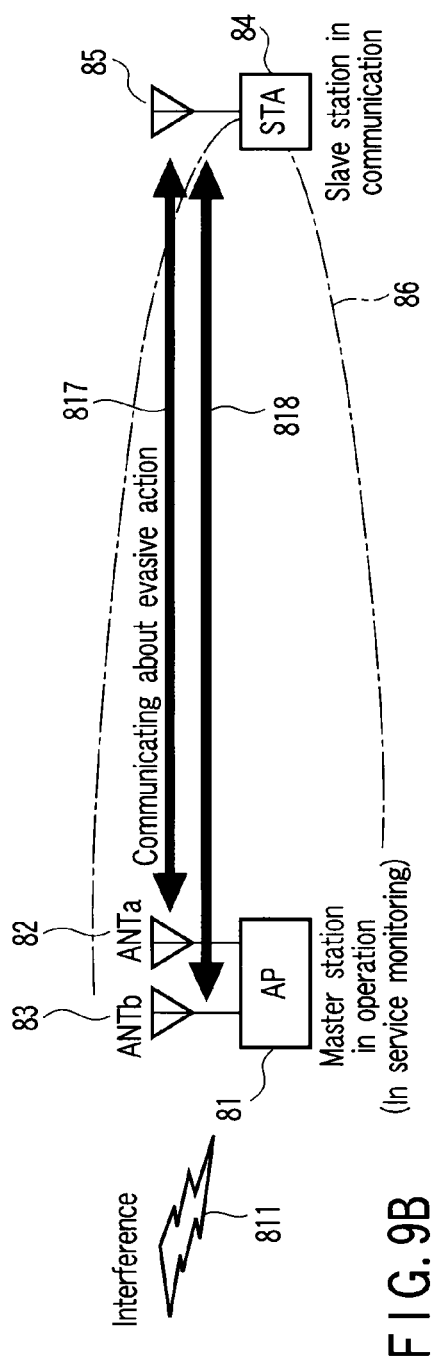
FIG. 9A
FIG. 9B

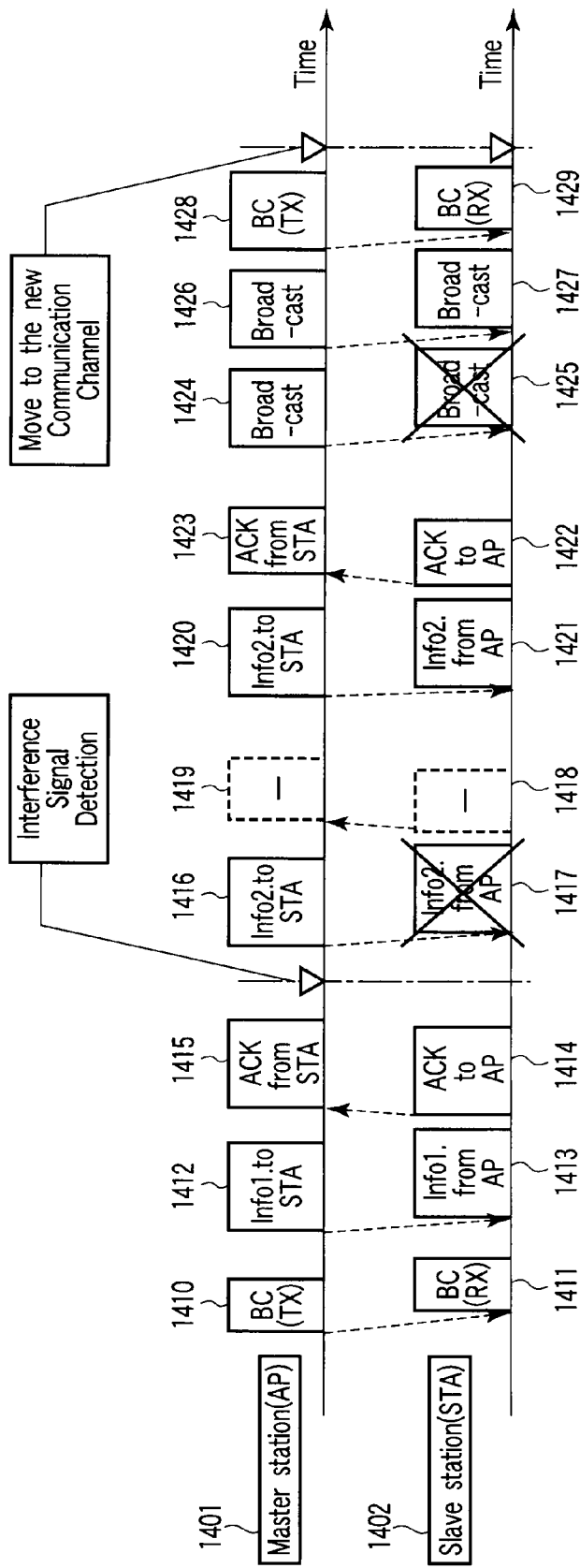
F I G. 15

RADIO COMMUNICATION SYSTEM CAPABLE OF MAINTAINING COMMUNICATION PERFORMED BETWEEN MASTER STATION AND SLAVE STATION BELONGING TO SUCH MASTER STATION EVEN WHEN INTERFERENCE SIGNAL IS DETECTED

CROSS-REFERENCE TO RELATED APPLICATIONS

This application is based upon and claims the benefit of priority from prior Japanese Patent Application No. 2007-150976, filed Jun. 6, 2007, the entire contents of which are incorporated herein by reference.

BACKGROUND OF THE INVENTION

1. Field of the Invention

The present invention relates to a radio communication system, the communication system comprising: one master station such as a base station or an access point which transmits information or data without being controlled by another radio station and which is capable of independently setting a channel for use in a radio communication; and a number of slave stations such as terminals or stations whose radio communication channel used and transmission/reception operations (slave mode) are controlled by the master station thereof. More particularly, the present invention relates to a communication method in the case where a master station or a slave station has detected an interference signal during a radio communication performed between the master station and the slave station when a wireless local area network (wireless LAN) is operated.

2. Description of the Related Art

A wireless LAN which has begun to spread from the installation in personal computers (PCs) is being gradually expanded to various other products, such as PC peripheral devices, mobile telephones, game machines, home electric appliances and in-vehicle navigation systems. The wireless LAN is compliant with a standard "IEEE 802.11" defined by the Institute of Electrical & Electronics Engineers in the U.S.

The wireless LAN mainly used at present is compliant with the "IEEE 802.11b/g" standard, and is available at a relatively low cost. However, this wireless LAN uses a 2.4 gigahertz (GHz) band as a radio communication channel, so that if it is installed in many products, expanded into various markets and comes into wide use as described above, a jam is caused in the use of the channel, and there arises a problem of the depletion of frequency resources which have only been assigned up to about the 83.5 megahertz (MHz) band. In particular, the 2.4 GHz band is also released as an industry medical science (ISM) band. This is actually in operation in applications other than the wireless LANs, such as a point of sale (POS) system, an in-warehouse product management system (TAG system), microwave ovens, a telemeter system, a video materials transmission system and cordless telephones. A well-known system operated in the same frequency band is Bluetooth (registered trademark) which has started to rapidly grow in the installation into, for example, mobile telephones to achieve wireless headset (earphone) and hands-free functions. Presently, the number of shipments and the degree of market dominance (the degree of market occupancy) of mobile telephones tend to be on the increase, and there is an urgent need for measures against future depletion of frequency resources.

To meet the above-mentioned needs of the market, a policy to release a new frequency band available for wireless LAN has been continuously executed from around year 2000. For example, a 100 MHz band ranging from 5.15 GHz to 5.25 GHz was released in the year 2000, and a 100 MHz band ranging from 5.25 GHz to 5.35 GHz was released in the year 2005. Then, a 255 MHz band ranging from 5.47 GHz to 5.725 GHz was newly released in the year 2007. As a result, the total frequency band available for wireless LAN in the 5 GHz band has attained 455 MHz. Thus, if a 100 MHz band for the industry science medical (ISM) band (a band of 5.725 GHz to 5.825 GHz) assigned to a 5.8 GHz band is included, a band of 555 MHz is available for wireless LAN. Since a band about 6.6 times as wide as 83.5 MHz on a 2.4 GHz band is available, the problem of the depletion of the frequency resources is expected to be solved.

However, out of the above-mentioned 555 MHz band, a total of 355 MHz including the 5.25 GHz to 5.35 GHz band and the 5.47 GHz to 5.725 GHz band is assigned to radiolocation, e.g., meteorological radar as a primary service. Since the wireless LAN is defined as a secondary service, the wireless LAN using this band is obliged to avoid interference with the primary services. Specifically, it is required that a radar detecting function be mounted in a radio facility operating the wireless LAN and that such a facility obey regulations for the operation of the wireless LAN during radar detection.

Common regulations for the mounting of the radar detecting function and the operation of the wireless LAN during the radar detection are set forth in the statute books of the Radio Law of Japan (radio installation rules), the federal communications commission (FCC) regulations of the U.S., and the European telecommunications standards institute (ETSI) regulations of Europe. In other words, these regulations are defined in accordance with a recommendation (universal standard) made in "world radiocommunication conference (WRC) 2003" held in the international telecommunication union-radiocommunication sector (ITU-R) in year 2003.

In the case of a radio communication system comprising one master station such as a base station or an access point which transmits information or data without being controlled by another radio station and which is capable of independently setting a channel for use in a radio communication, and a number of slave stations such as terminals or stations whose radio communication channel used and transmission/reception operations are controlled by the master station thereof, the master station is obliged to be mounted with the radar detecting function and to inform the slave station of a detection result as well as to control the transmission/reception operations of the slave stations. In addition, the slave stations are exempted from the mounting of the radar detecting function as long as they perform the transmission/reception operations in accordance with the instructions of the master station.

Furthermore, the regulations include operation regulations for the case where radar waves are detected after a communication has been started between the master station and the slave station. The master station is always required to take an evasive action based on these operation regulations in the event of a radar detection (in service monitoring) during the communication. Specifically, when the master station detects radar waves during a communication, the operation in a current radio communication channel used so far is forbidden, and the master station has to move to a new radio communication channel together with all the slave stations. In this case, also specified are the total time of communication (260 msec) between the master station and the slave station starting from radar detection, and the time (10 sec) for the stopping of the operation in the current radio communication channel and the completion of the move to the new radio communication channel, providing insufficient time. In other words, the master station which has detected the radar waves has to inform, within the above-mentioned total communication time (260 msec), all the slave stations belonging thereto of instructions for the terminations or discontinuation of communications currently established and of moves to a new radio communication channel. According to "IEEE 802.11h", which is a frequency management standard, moves are simultaneously made to the new radio communication channel on the basis of beacon timing issued from the master station.

However, in the case of a radio communication system such as a basic service set (BSS) comprising a master station and all slave stations belonging to this master station, the operational problem is whether all the slave stations can be securely informed of information on the communication restriction (termination or discontinuation) and on the new radio communication channel to move to. In particular, for example, when the number of slave stations is high or when there is a slave station in a sleep mode or when a slave station is away from the master station, it is difficult to ensure that all the slave stations are informed of the evasive action after radar detection.

In "IEEE 802.11h", which is the frequency management standard, there are regulations concerning logical mechanisms, for example, operation procedures in the event of a radar detection, and communication message configuration therefor. However, no regulations have been set to cover a method of ensuring that the evasive action after the radar detection is reported from the master station to the slave stations in view of mandatory standards (radio laws) defined in various countries and regions.

One of the simplest methods that can be achieved under such various binding conditions is timeout processing in the slave stations carried out by unilateral forced disconnection from the master station. However, the major premise of operating the wireless LAN at the frequency band mandating the radar detection is that "the radio communication channel used and the transmission/reception operations of the slave stations are controlled by the master station". In other words, if the slave station is allowed to freely run by the unilateral forced disconnection, this can go against the regulations. Moreover, this method is disadvantageous to the slave stations (e.g., users) because the information on the new radio communication channel to move to is not conveyed to the slave stations.

Furthermore, even if the slave stations are controlled by the master station in accordance with such regulations, some characteristic operation method is needed to ensure that the evasive action after the radar detection is reported to all the slave stations within the limited total communication time (260 msec), for which no considerations and regulations have been made so far.

As described above, in order to meet the market needs for the wireless LAN, the new frequency band has been released for the spread of the wireless LAN. However, in the case of a radio communication system comprising a master station and slave stations, when the master station has carried out a radar detection, the mounting and operation of a function conforming to the current mandatory standards (radio installations rules, FCC regulations, ETSI regulations) and the standard (IEEE 802.11h) alone do not make it possible to ensure that the master station can report the evasive action after the radar detection to the slave stations, which can cause inconvenience and disadvantages to the users, such as disconnection during operation.

In addition, as a technique associated with the present invention, there has already been made a proposal in which interference between Bluetooth equipment and wireless LAN equipment operated at the same 2.4 GHz band is detected, and a channel quality is estimated using a packet error rate to avoid the interference (see, for example, Jpn. Pat. Appln. KOKAI Publication No. 2006-211242).

BRIEF SUMMARY OF THE INVENTION

According to a first aspect of the present invention, there is provided a radio communication system comprising:

one master station which performs transmission without being controlled by another radio station and which is configured to independently set a channel for use in a radio communication; and at least one slave station which belongs to the one master station and whose radio communication channel used and transmission/reception operations are controlled by the master station, wherein when detecting an interference signal which disturbs the radio communication during operation, the one master station or the at least one slave station sets a first modulation scheme applied to the radio communication to the same second modulation scheme as a modulation scheme used in broadcast in order to convey information necessary for an evasive action to move to another radio communication channel.

According to a second aspect of the present invention, there is provided a radio communication system comprising:

one master station which performs transmission without being controlled by another radio station and which is configured to independently set a channel for use in a radio communication; and at least one slave station which belongs to the one master station and whose radio communication channel used and transmission/reception operations are controlled by the master station, wherein when detecting an interference signal which disturbs the radio communication during operation, the one master station or the at least one slave station sets a first transmission scheme applied to the radio communication to a second transmission scheme lower in frequency use efficiency than the first transmission scheme in order to convey information necessary for an evasive action to move to another radio communication channel.

According to a third aspect of the present invention, there is provided a radio communication system comprising:

one master station which performs transmission without being controlled by another radio station and which is configured to independently set a channel for use in a radio communication; and at least one slave station which belongs to the one master station and whose radio communication channel used and transmission/reception operations are controlled by the master station, wherein when detecting an interference signal which disturbs the radio communication during operation, the one master station or the at least one slave station sets a first transmission power applied to the radio communication to a second transmission power greater than the first transmission power in order to convey information necessary for an evasive action to move to another radio communication channel.

BRIEF DESCRIPTION OF THE SEVERAL
VIEWS OF THE DRAWING

FIG. 1 is a diagram shown to explain an operation for setting a scheme of transmission between a master station and slave stations in a radio communication system according to a first embodiment of the present invention;

FIG. 3 is a diagram shown to explain a law (Radio Law) to be followed by the master station and the slave stations according to the radio communication system of the present invention;

FIGS. 9A and 9B are diagrams shown to explain an operation for setting a scheme of transmission between a master station and a slave station in a radio communication system according to a sixth embodiment of the present invention;

FIG. 15 is a diagram shown to explain the effects of time diversity in the radio communication system according to the present invention;

Figure 16:
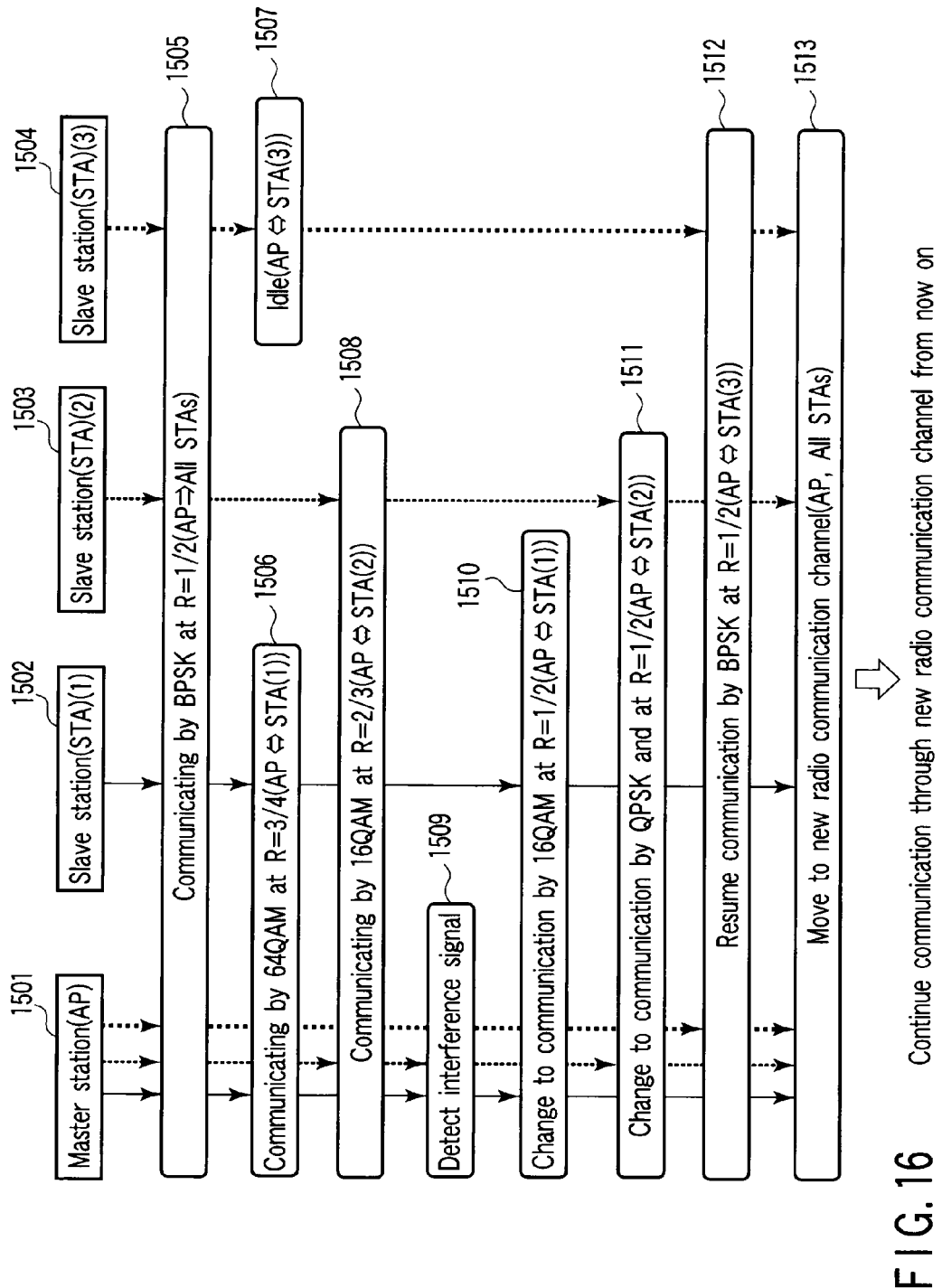
Figure 17:
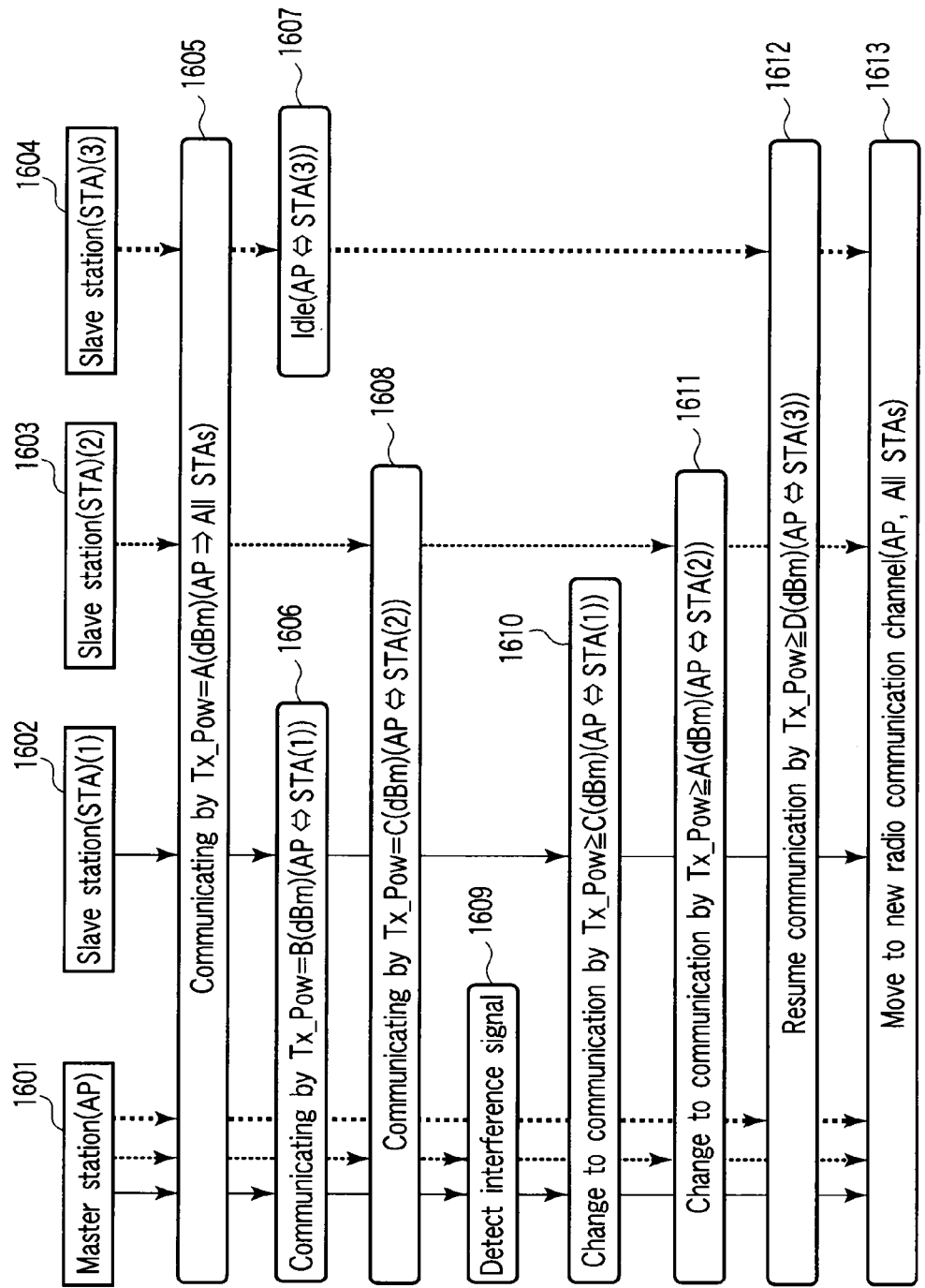

FIG. 16 is a diagram shown to explain an operation for setting a scheme of transmission between a master station and slave stations in a radio communication system according to a tenth embodiment of the present invention; and FIG. 17 is a diagram shown to explain an operation for setting a scheme of transmission between a master station and slave stations in a radio communication system according to an eleventh embodiment of the present invention.

DETAILED DESCRIPTION OF THE INVENTION

Embodiments of the present invention will be described with reference to the accompanying drawings. It should be noted that the drawings are schematic ones and the dimension ratios shown therein are different from the actual ones. The dimensions vary from drawing to drawing and so do the ratios of dimensions. The following embodiments are directed to a device and a method for embodying the technical concept of the present invention and the technical concept does not specify the material, shape, structure or configuration of components of the present invention. Various changes and modifications can be made to the technical concept without departing from the scope of the claimed invention.

First Embodiment

FIG. 1 shows one example of an operation in a radio communication system according to a first embodiment of the present invention. In the present embodiment, a modulation scheme (transmission scheme) used in a communication between a master station (AP) and slave stations (STAs) is explained taking as an example a case intended for a time axis. Specifically, a communication using a certain radio communication frequency (radio communication channel) and taking place between a master station (AP) 11 and a slave station (STA) (1) 12 as well as a slave station (STA) (2) 13 belonging to the master station (AP) 11 with the passage of time is explained.

In addition, the present embodiment shows an example in which the master station (AP) 11 not only controls the setting of a radio communication channel used and the transmission/reception operations of the slave stations (STAs) 12, 13 but also detects an interference signal (e.g., radar waves) 112 and changes the modulation scheme used in the communication to the same modulation scheme as a beacon 110 in order to report an evasive action after a radar detection. However, the detection of the interference signal and the change of the modulation scheme are not limited to this example. For example, although the slave stations (STAs) 12, 13 are exempted from the mounting of a radar detecting function as described above, they can be configured to be mounted with the radar detecting function. Therefore, one or all of the slave stations (STAs) 12, 13 can be configured so that the interference signal is detected and so that the modulation scheme is changed to the same modulation scheme as the beacon 110.

For example, as shown in FIG. 1, the beacon 110 is periodically transmitted from the master station (AP) 11 to the slave station (STA) (1) 12 and the slave station (STA) (2) 13. The beacon 110 is intended for the transmission of report information by phase shift keying (PSK) modulation. Moreover, normal data 111 is transmitted/received by quadrature amplitude modulation (QAM) between the master station (AP) 11 and the slave station (STA) (1) 12. In addition, the slave station (STA) (2) 13 belongs to the master station (AP) 11, but has no data to communicate and is therefore in an idle state.

Here, the master station (AP) 11 needs to constantly monitor the presence of the interference signal 112 coming from another radio system (not shown) during the operation of a wireless LAN. When detecting the interference signal 112, the master station (AP) 11 has to immediately terminate the use of the current radio communication channel and take an evasive action 113 to move to another radio communication channel. To this end, after the detection of the interference signal 112, the master station (AP) 11 transmits the detection status of the interference signal 112 and information 114 for the move to another radio communication channel, to the slave station (STA) (1) 12 by the same PSK modulation as the beacon 110. In the same manner, the master station (AP) 11 transmits the detection status of the interference signal 112 and information 115 for the move to another radio communication channel, to the slave station (STA) (2) 13 by the same PSK modulation as the beacon 110. In addition, the modulation scheme of report information 116 other than the beacon 110 transmitted to the slave station (STA) (1) 12 and the slave station (STA) (2) 13 from the master station (AP) 11 is the same PSK as the beacon 110.

Owing to the information 114, 115 and the information 116 transmitted to the slave station (STA) (1) 12 and the slave station (STA) (2) 13, the slave station (STA) (1) 12 and the slave station (STA) (2) 13 obtain information on a new radio communication channel to move to. Thereby, the slave station (STA) (1) 12 and the slave station (STA) (2) 13 make a change 117 of the radio communication channel together with the master station (AP) 11.

Thus, in the first embodiment described above, when the master station (AP) 11 has detected the interference signal 112 from another radio communication system during the operation of the radio communication system (wireless LAN), the master station (AP) 11 immediately terminates the use of the current radio communication channel, and conveys the information 114, 115, 116 necessary for the evasive action 113 to move to another radio communication channel by use of the same modulation scheme as the beacon 110 used in broadcast. This increases the resistance to radio propagation errors and therefore ensures that the information 114, 115, 116 for taking the evasive action can be transmitted to the slave station (STA) (1) 12 and the slave station (STA) (2) 13.

In addition, while two slave stations (STA) (1) 12, (STA) (2) 13 have been explained as an example in the present embodiment, the present invention is not limited to this. In other words, there is no limit to the number of slave stations (STAs) belonging to a certain master station (AP).

Second Embodiment

Figure 2A:
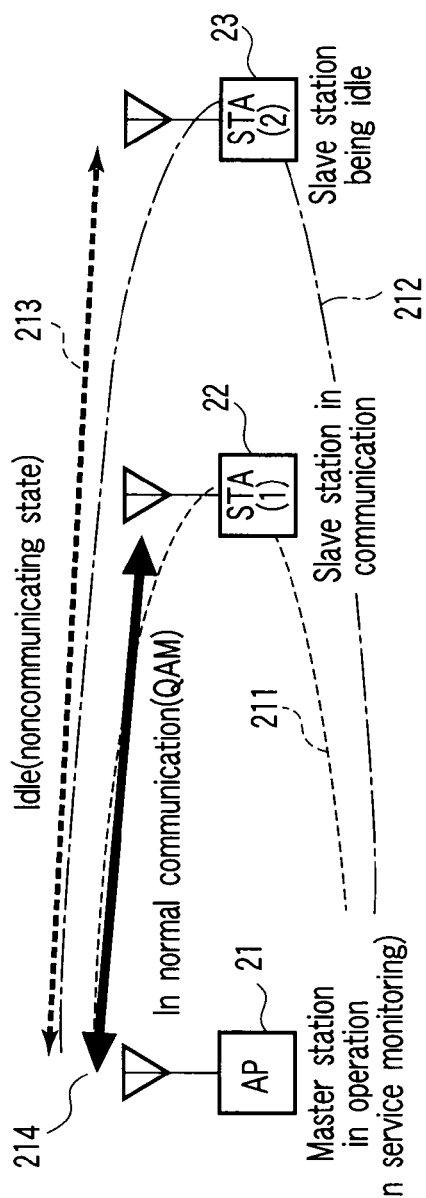
FIGS. 2A and 2B are diagrams shown to explain an operation for setting a scheme of transmission between a master station and slave stations in a radio communication system according to a second embodiment of the present invention.
Figure 2B:
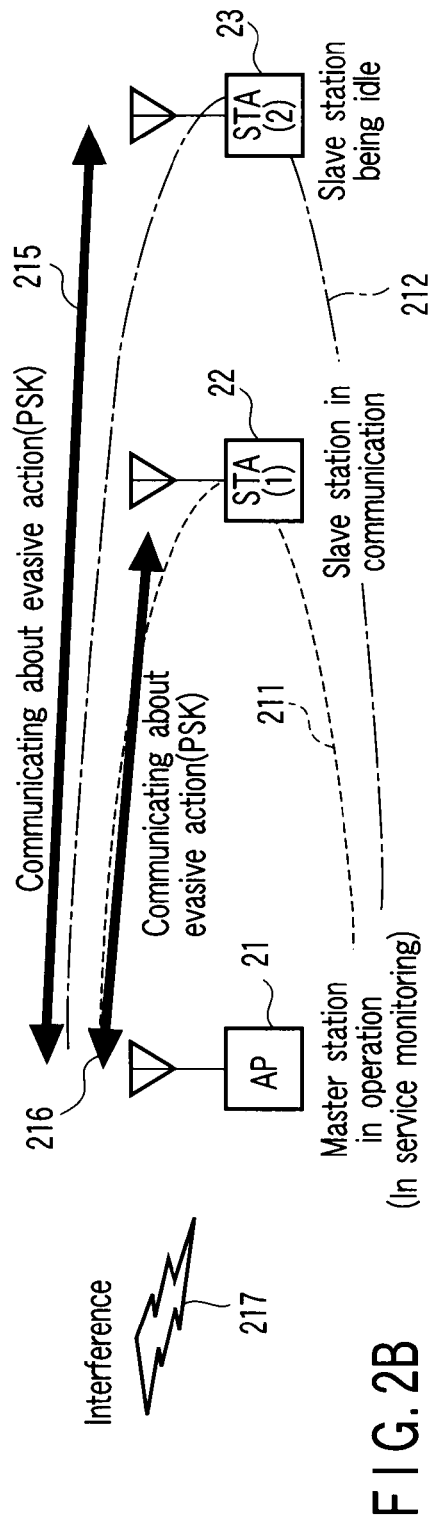

FIGS. 2A and 2B show one example of an operation in a radio communication system according to a second embodiment of the present invention. In an example explained in the present embodiment, a modulation scheme used in a communication between a master station (AP) and slave stations (STAs) is intended for a communication area. Moreover, FIG. 2A is shown to explain the operation of the radio communication system during a normal operation, that is, before the detection of an interference signal, and FIG. 2B is shown to explain the operation of the radio communication system after the detection of the interference signal.

In addition, the present embodiment shows an example in which a master station (AP) 21 not only controls the setting of a radio communication channel used and the transmission/reception operations of slave stations (STAs) 22, 23 but also detects an interference signal (e.g., radar waves) 217 and changes the modulation scheme used in the communication to the same modulation scheme (PSK) as a beacon in order to report an evasive action after a radar detection. However, the detection of the interference signal and the change of the modulation scheme are not limited to this example. For example, although the slave stations (STAs) 22, 23 are exempted from the mounting of a radar detecting function as described above, they can be configured to be mounted with the radar detecting function. Therefore, one or all of the slave stations (STAs) 22, 23 can be configured so that the interference signal is detected and so that the modulation scheme is changed to the same modulation scheme (PSK) as the beacon.

In the present embodiment, as shown in, for example, FIG. 2A, a normal communication 214 is performed by QAM modulation, which is a modulation scheme corresponding to a communication area 211 between the master station (AP) 21 performing an in service monitoring operation for monitoring the present of an interference signal the radio communication during operation and the slave station (STA) (1) 22. Moreover, the idle slave station (STA) (2) 23 located in a broad communication area 212 far from the slave station (STA) (1) 22 performs no communication with the master station (AP) 21 (a noncommunicating state 213).

In this state, as shown in, for example, FIG. 2B, the master station (AP) 21 which has detected the interference signal 217 from another radio system (not shown) immediately conveys, to the slave station (STA) (1) 22 and the slave station (STA) (2) 23 by PSK modulation, information 215, 216 necessary to terminate the use of the current radio communication channel and necessary for the evasive action to move to another radio communication channel. Thus, the slave station (STA) (1) 22 and the slave station (STA) (2) 23 obtain information on a new radio communication channel to move to. Subsequently, the slave station (STA) (1) 22 and the slave station (STA) (2) 23 change the radio communication channel together with the master station (AP) 21.

Thus, in the second embodiment described above, when the master station (AP) 21 has detected the interference signal 217 from another radio communication channel during the operation of the radio communication system (wireless LAN), the master station (AP) 21 immediately terminates the use of the current radio communication channel, and changes the modulation scheme (QAM) available in the communication so far to the same modulation scheme (PSK) as the beacon 110 reachable in a wide range and then conveys the information 215, 216 necessary for the evasive action to move to another radio communication channel. This can increase the resistance to radio propagation errors and therefore ensures that the information 215, 216 for taking the evasive action can be transmitted to the slave station (STA) (1) 22 and the slave station (STA) (2) 23.

In addition, while two slave stations (STA) (1) 22, (STA) (2) 23 have been explained as an example in the present embodiment, the present invention is not limited to this. In other words, there is no limit to the number of slave stations (STAs) belonging to a certain master station (AP).

FIG. 3 is shown to explain a law (Radio Law) required to be followed by the master station (AP) and the slave stations (STAs) according to the radio communication system of the present invention. The law prescribes that when an interference signal is detected, the use of a current radio communication channel (transmission/reception) be stopped and a move be made to a new radio communication channel within 10 sec. The law also prescribes that a total communication time (the sum of transmission times) within the period (10 sec) of transition to the new radio communication channel be 260 msec.

In the explanation, a target radio communication system comprises a master station (AP) 31, and slave stations (STA) (1) 32, (STA) (2) 33, . . . , (STA) (n) 34. Note that n of the slave station (STA) (n) 34 is a natural number, and is a value equal to or greater than "3" in the present example.

For example, a beacon (BC-TX) 310 is transmitted from the master station (AP) 31 during a normal operation. On the other hand, a beacon (BC-RX) 311 is received in the slave station (STA) (1) 32, a beacon (BC-RX) 312 is received in the slave station (STA) (2) 33, and a beacon (BC-RX) 313 is received in the slave station (STA) (1) 34. The slave stations (STA) (1) 32, (STA) (2) 33, . . . , (STA) (n) 34 are different from each other in the propagation distance from the master station (AP) 31, and are therefore temporally different in reception timing.

After the master station (AP) 31 has detected the interference signal, a total time (t1+t2+t3+t4+t5+t6+t7+t8) is 260 msec or less, wherein t1 is a transmission time of transmission information 320 from the master station (AP) 31 to the slave station (STA) (1) 32, t2 is a transmission time of response information 322 to the master station (AP) 31 in response to reception information 321 in the slave station (STA) (1) 32, t3 is a transmission time of transmission information 330 from the master station (AP) 31 to the slave station (STA) (2) 33, t4 is a transmission time of response information 332 to the master station (AP) 31 in response to reception information 331 in the slave station (STA) (2) 33, ..., t5 is a transmission time of transmission information 340 from the master station (AP) 31 to the slave station (STA) (n) 34, t6 is a transmission time of response information 342 to the master station (AP) 31 in response to reception information 341 in the slave station (STA) (n) 34, t7 is a transmission time of report information 350 transmitted from the master station (AP) 31 to all the slave stations (STA) (1) 32, (STA) (2) 33, ..., (STA) (n) 34, and t8 is a transmission time of a beacon 360 transmitted from the master station (AP) 31 to all the slave stations (STA) (1) 32, (STA) (2) 33, ..., (STA) (n) 34. The time of moving to the new radio communication channel by the series of communications (time from the timing of the "interference signal detection" to the "move to the new communication channel") has to be 10 sec or less.

As described above, in the radio communication system, the total of the available communication times (transmission times) is set for the transmission of information on the move to the new radio communication channel after the detection of the interference signal from the master station (AP) 31 to the slave stations (STA) (1) 32, (STA) (2) 33, ..., (STA) (n) 34. It is therefore necessary to ensure that required information is transmitted to the slave stations (STA) (1) 32, (STA) (2) 33, ..., (STA) (n) 34 in a short communication time. Thus, in the first and second embodiments described above, their effects can be easily obtained.

Third Embodiment

Figure 4:
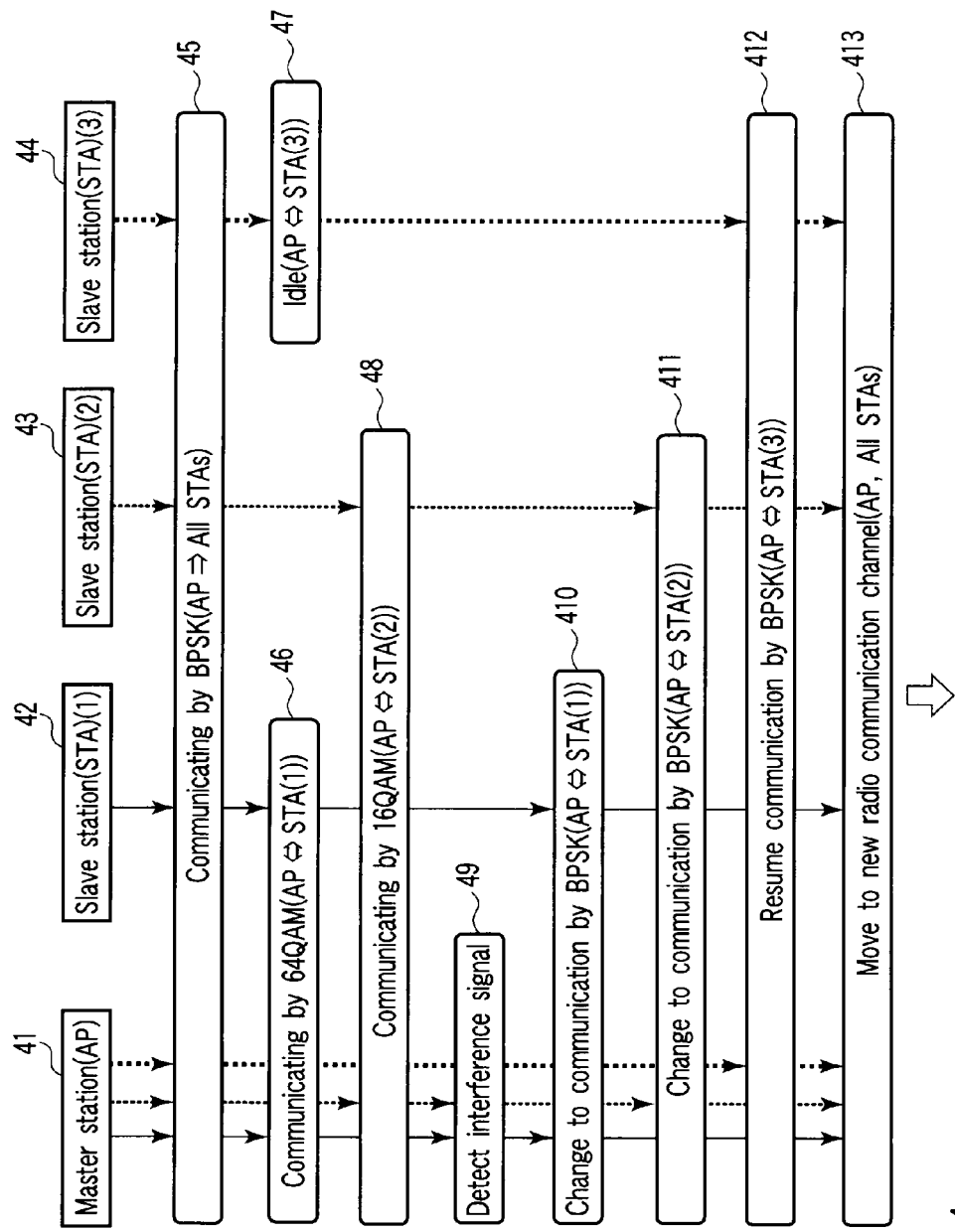
FIG. 4 is a diagram shown to explain an operation for setting a scheme of transmission between a master station and slave stations in a radio communication system according to a third embodiment of the present invention.

FIG. 4 shows one example of an operation in a radio communication system according to a third embodiment of the present invention. Explained in the present embodiment is a setting process (flow) of a modulation scheme (information transmission efficiency) used in a communication between a master station (AP) and slave stations (STAs).

In addition, the present embodiment shows an example in which a master station (AP) 41 not only controls the setting of a radio communication channel used and the transmission/reception operations of slave stations (STAs) 42, 43, 44 but also detects an interference signal (e.g., radar waves) 49 and changes the modulation scheme used in the communication to the same modulation scheme as a beacon 45. However, the detection of the interference signal and the change of the modulation scheme are not limited to this example. For example, although the slave stations (STAs) 42, 43, 44 are exempted from the mounting of a radar detecting function as described above, they can be configured to be mounted with the radar detecting function. Therefore, one or all of the slave stations (STAs) 42, 43, 44 can be configured so that the interference signal is detected and so that the modulation scheme is changed to the same modulation scheme as the beacon 45.

For example, each of the slave stations (STA) (1) 42, (STA) (2) 43, (STA) (3) 44 is set in a state capable of communicating with the master station (AP) 41. In other words, the slave stations (STA) (1) 42, (STA) (2) 43, (STA) (3) 44 belong to the master station (AP) 41, and the common beacon 45 from the master station (AP) 41 is transmitted after modulated by binary phase shift keying (BPSK) simultaneously to all the slave stations (STA) (1) 42, (STA) (2) 43, (STA) (3) 44.

In the present embodiment, the slave station (STA) (1) 42 is present in an area in good communication with the master station (AP) 41, and a communication 46 using a modulation scheme with good information transmission efficiency, for example, 64QAM is performed between the master station (AP) 41 and the slave station (STA) (1) 42. Moreover, the slave station (STA) (2) 43 is present in an area in poorer communication than the slave station (STA) (1) 42, and a communication 48 using a modulation scheme with lower information transmission efficiency than that of 64QAM, for example, 16QAM is performed between the master station (AP) 41 and the slave station (STA) (2) 43. On the other hand, there is no information communicated between the slave station (STA) (3) 44 and the master station (AP) 41, so that the slave station (STA) (3) 44 is in an idle state 47 and is capable of receiving the common beacon 45 alone.

In such a normal operation state, if the interference signal 49 from another radio system (not shown) is detected by an in service monitoring function of the master station (AP) 41, the master station (AP) 41 executes an interference signal detection process. In other words, the master station (AP) 41 changes the modulation scheme (64QAM) used in the communication 46 with the slave station (STA) (1) 42 to the same modulation scheme (BPSK) as the beacon 45, and performs a communication 410 with the slave station (STA) (1) 42. In the same manner, the master station (AP) 41 changes the modulation scheme (16QAM) used in the communication 48 with the slave station (STA) (2) 43 to the same modulation scheme (BPSK) as the beacon 45, and performs a communication 411 with the slave station (STA) (2) 43. Moreover, as the slave station (STA) (3) 44 which had been in the idle state 47 has not been in communication so far, the master station (AP) 41 resumes a communication 412 using the same modulation scheme (BPSK) as the beacon 45. After information has thus been securely conveyed to all the slave stations (STA) (1) 42, (STA) (2) 43, (STA) (3) 44, the master station (AP) 41 and the slave stations (STA) (1) 42, (STA) (2) 43, (STA) (3) 44 together carry out a process 413 for moving to a new radio communication channel.

Thus, in the third embodiment described above, even when the master station (AP) 41 has detected an interference signal from another radio communication channel during the operation of the radio communication system (wireless LAN), the master station (AP) 41 immediately terminates the use of the current radio communication channel, and conveys (the communications 410, 411, 412) the information necessary for an evasive action to move to another radio communication channel (moving process 413) by use of the same modulation scheme as the beacon 45. This can make it difficult for radio propagation errors between the master station (AP) 41 and the slave station (STA) (1) 42, (STA) (2) 43, (STA) (3) 44 to be caused, thereby ensuring that the information for the evasive action can be conveyed.

In addition, while three slave stations (STA) (1) 42, (STA) (2) 43, (STA) (3) 44 have been explained as an example in the present embodiment, the present invention is not limited to this. In other words, there is no limit to the number of slave stations (STAs) belonging to a certain master station (AP).

Fourth Embodiment

Figure 5:
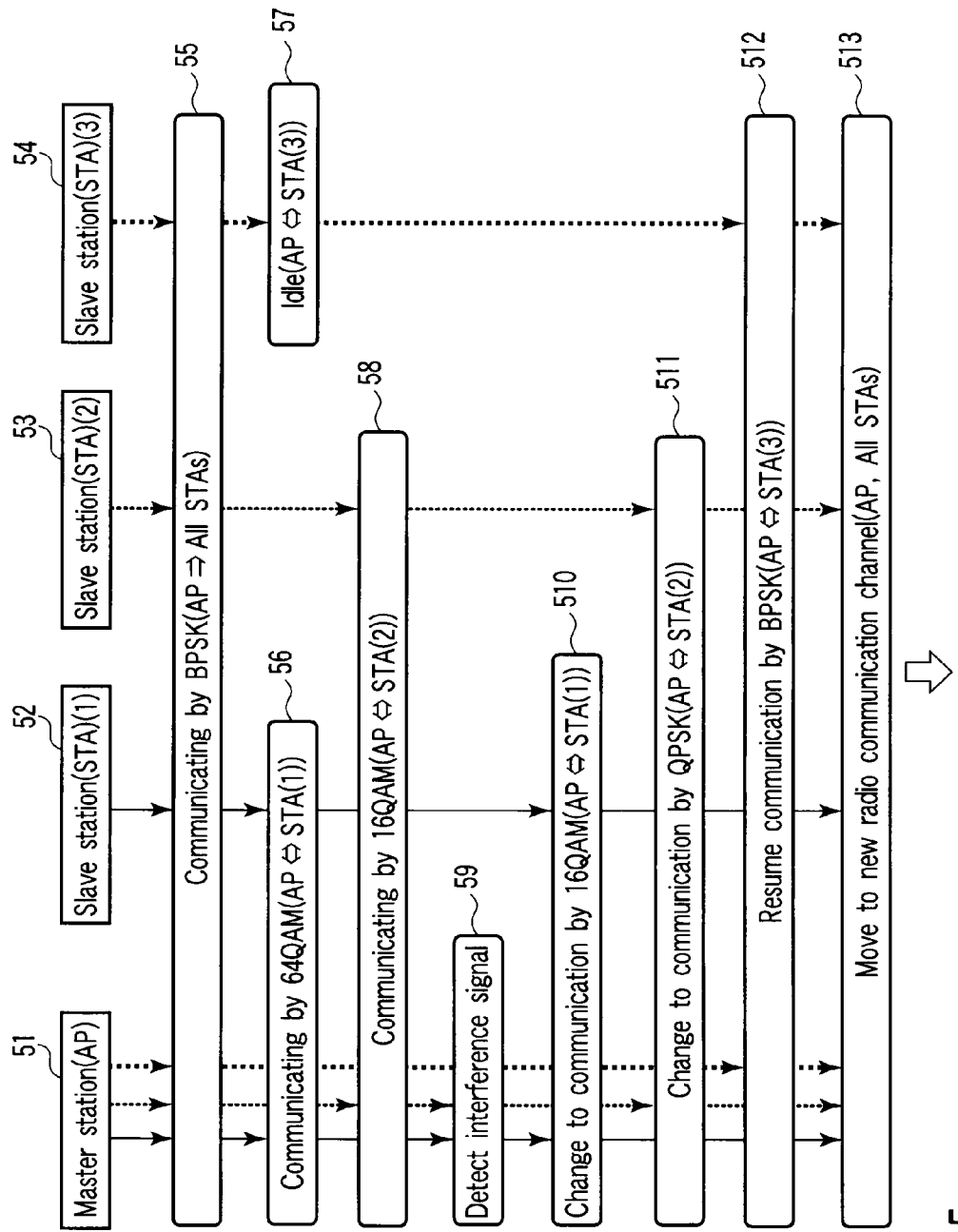
FIG. 5 is a diagram shown to explain an operation for setting a scheme of transmission between a master station and slave stations in a radio communication system according to a fourth embodiment of the present invention.

FIG. 5 shows one example of an operation in a radio communication system according to a fourth embodiment of the present invention. Explained in the present embodiment is a setting process (flow) of a modulation scheme (frequency use efficiency) used in a communication between a master station (AP) and slave stations (STAs).

In addition, the present embodiment shows an example in which a master station (AP) 51 not only controls the setting of a radio communication channel used and the transmission/reception operations of slave stations (STAs) 52, 53, 54 but also detects an interference signal (e.g., radar waves) 59 and changes the modulation scheme used in the communications with the slave stations (STAs) 52, 53, 54. However, the detection of the interference signal and the change of the modulation scheme are not limited to this example. For example, although the slave stations (STAs) 52, 53, 54 are exempted from the mounting of a radar detecting function as described above, they can be configured to be mounted with the radar detecting function. Therefore, one or all of the slave stations (STAs) 52, 53, 54 can be configured so that the interference signal is detected and so that the modulation scheme is changed.

For example, each of the slave stations (STA) (1) 52, (STA) (2) 53, (STA) (3) 54 is set in a state capable of communicating with the master station (AP) 51. In other words, the slave stations (STA) (1) 52, (STA) (2) 53, (STA) (3) 54 belong to the master station (AP) 51, and a common beacon 55 from the master station (AP) 51 is transmitted after BPSK-modulated simultaneously to all the slave stations (STA) (1) 52, (STA) (2) 53, (STA) (3) 54.

In the present embodiment, the slave station (STA) (1) 52 is present in an area in good communication with the master station (AP) 51, and a communication 56 using a modulation scheme with high frequency use efficiency, that is, a modulation scheme such as 64QAM permitting a large number of information bits to be transmitted per unit time and unit frequency is performed between the master station (AP) 51 and the slave station (STA) (1) 52. Moreover, the slave station (STA) (2) 53 is present in an area in poorer communication than the slave station (STA) (1) 52, and a communication 58 using a modulation scheme with lower frequency use efficiency than 64QAM, that is, a modulation scheme such as 16QAM permitting a smaller number of information bits to be transmitted per unit time and unit frequency than 64QAM is performed between the master station (AP) 51 and the slave station (STA) (2) 53. On the other hand, there is no information communicated between the slave station (STA) (3) 54 and the master station (AP) 51, so that the slave station (STA) (3) 54 is in an idle state 57 and is capable of receiving the common beacon 55 alone.

In such a normal operation state, if the interference signal 59 from another radio system (not shown) is received by an in service monitoring function of the master station (AP) 51, the master station (AP) 51 executes an interference signal detection process. In other words, the master station (AP) 51 changes the modulation scheme (64QAM) used in the communication 56 with the slave station (STA) (1) 52 to the modulation scheme (16QAM) with lower frequency use efficiency but with higher resistance to radio propagation errors, and performs a communication 510 with the slave station (STA) (1) 52. In the same manner, the master station (AP) 51 changes the modulation scheme (16QAM) used in the communication 58 with the slave station (STA) (2) 53 to the modulation scheme (quadrature phase shift keying (QPSK)) with lower frequency use efficiency but with higher resistance to radio propagation errors, and performs a communication 511 with the slave station (STA) (2) 53. Moreover, as the slave station (STA) (3) 54 which had been in the idle state 57 has not been in communication so far, the master station (AP) 51 resumes a communication 512 using, for example, the same modulation scheme (BPSK) as the beacon 55. After information has thus been securely conveyed to all the slave stations (STA) (1) 52, (STA) (2) 53, (STA) (3) 54, the master station (AP) 51 and the slave stations (STA) (1) 52, (STA) (2) 53, (STA) (3) 54 together carry out a process 513 for moving to a new radio communication channel.

Thus, in the fourth embodiment described above, even when the master station (AP) 51 has detected an interference signal from another radio communication system during the operation of the radio communication system (wireless LAN), the master station (AP) 51 immediately terminates the use of the current radio communication channel, and conveys (the communications 510, 511, 512) the information necessary for an evasive action to move to another radio communication channel (moving process 513) by use of the modulation scheme with higher resistance to radio propagation errors than the modulation scheme which has so far been used by the slave stations (STA) (1) 52, (STA) (2) 53, (STA) (3) 54. This can make it difficult for radio propagation errors between the master station (AP) 51 and the slave station (STA) (1) 52, (STA) (2) 53, (STA) (3) 54 to be caused, thereby ensuring that the information for the evasive action can be conveyed.

In addition, while three slave stations (STA) (1) 52, (STA) (2) 53, (STA) (3) 54 have been explained as an example in the present embodiment, the present invention is not limited to this. In other words, there is no limit to the number of slave stations (STAs) belonging to a certain master station (AP).

Figures 6, 7:
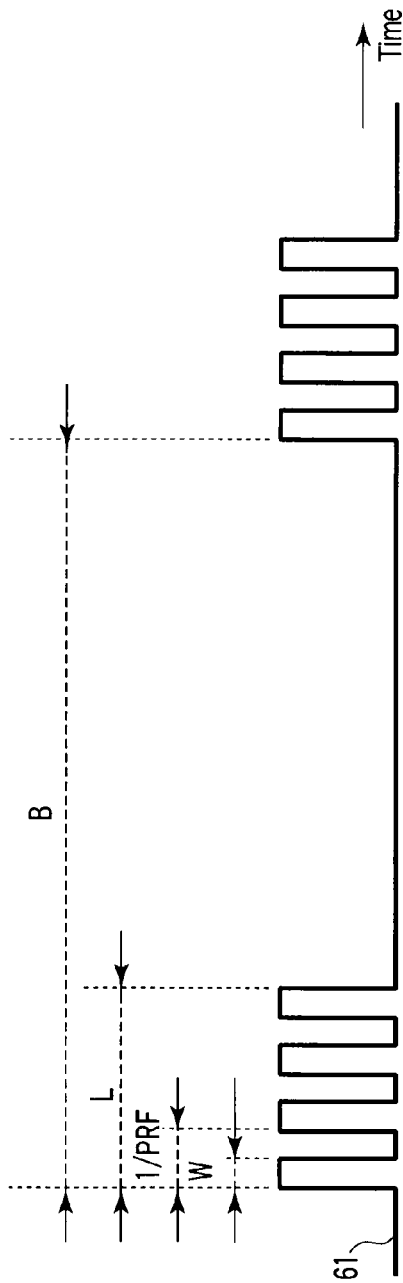
FIG. 6 is a diagram shown to explain an interference signal detected by the master station in the radio communication system according to the present invention.
FIG. 7 is a diagram showing one example of radar waves when an interference signal is as a radar wave.

FIG. 6 is shown to explain the interference signal detected by the master station in the radio communication system according to the present invention. In other words, it is supposed that the interference signal is a periodic radio signal and comprises radar waves used in radiolocation. The radar waves are schematically a signal such as a time waveform 61, for example, as shown in FIG. 6. Note that, in FIG. 6, "B" indicates a burst period, "L" indicates a burst length, "PRF" indicates a pulse repetition frequency, and "W" indicates a pulse width.

FIG. 7 shows one example of radar waves which are the interference signal. There are a plurality of kinds of radar waves 62 which have different specifications. Although six kinds of radar waves 62 are shown in the present example, radar waves of other specifications can also be targeted for detection as interference signals.

Fifth Embodiment

Figure 8:
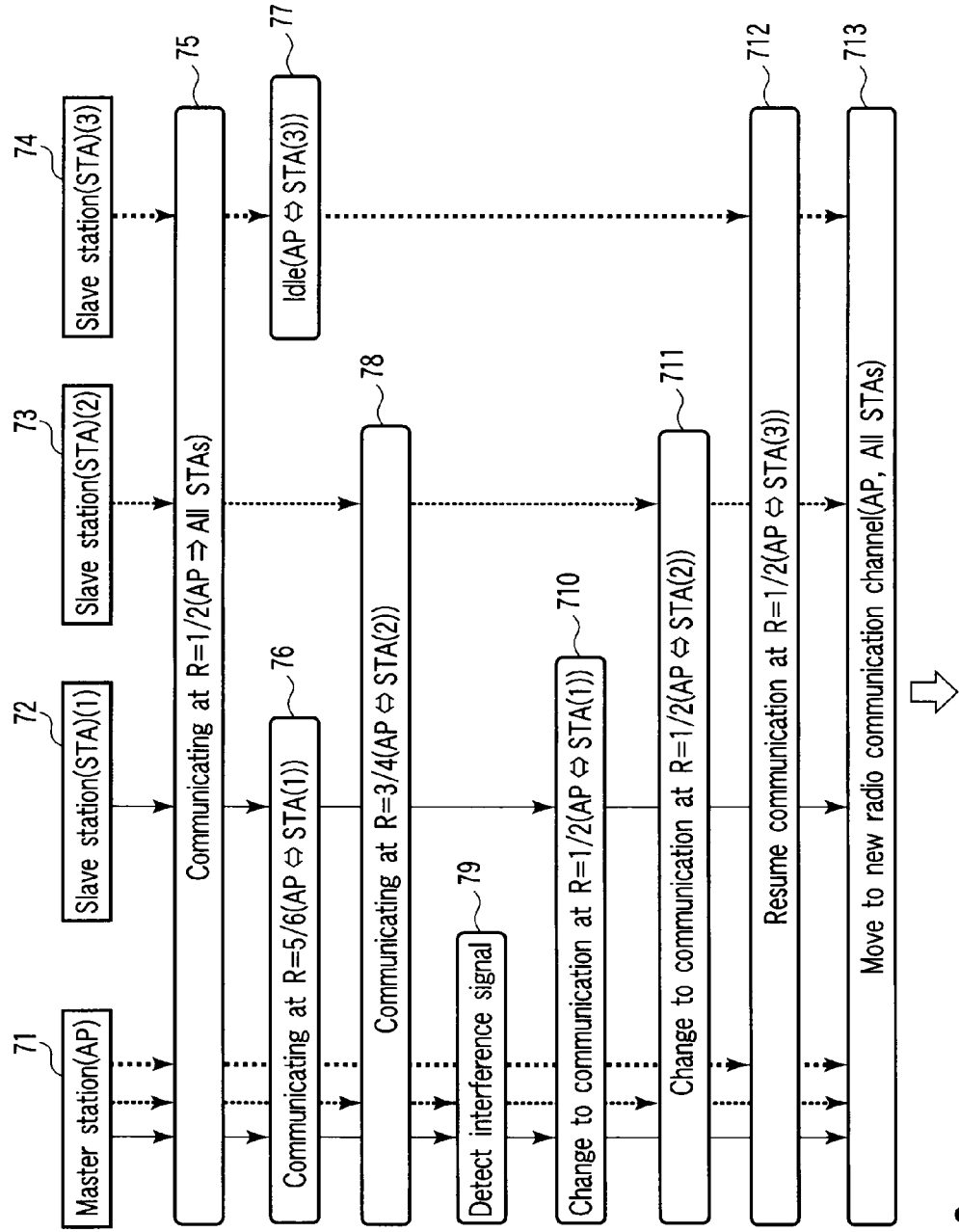
FIG. 8 is a diagram shown to explain an operation for setting a scheme of transmission between a master station and slave stations in a radio communication system according to a fifth embodiment of the present invention.

FIG. 8 shows one example of an operation in a radio communication system according to a fifth embodiment of the present invention. Explained in the present embodiment is a setting process (flow) in the case where the encoding ratio of error correction (convolution code) is employed as a transmission scheme used in a communication between a master station (AP) and slave stations (STAs).

In addition, the present embodiment shows an example in which a master station (AP) 71 not only controls the setting of a radio communication channel used and the transmission/reception operations of slave stations (STAs) 72, 73, 74 but also detects an interference signal (e.g., radar waves) 79 and changes an error correction scheme (encoding ratio) used in the communications with the slave stations (STAs) 72, 73, 74. However, the detection of the interference signal and the change of the error correction scheme are not limited to this example. For example, although the slave stations (STAs) 72, 73, 74 are exempted from the mounting of a radar detecting function as described above, they can be configured to be mounted with the radar detecting function. Therefore, one or all of the slave stations (STAs) 72, 73, 74 can be configured so that the interference signal is detected and so that the error correction scheme (encoding ratio) used in the communications is changed.

For example, each of the slave stations (STA) (1) 72, (STA) (2) 73, (STA) (3) 74 is set in a state capable of communicating with the master station (AP) 71. In other words, the slave stations (STA) (1) 72, (STA) (2) 73, (STA) (3) 74 belong to the master station (AP) 71, and a common beacon 75 from the master station (AP) 71 is transmitted after being encoded at an encoding ratio R=1/2 simultaneously to all the slave stations (STA) (1) 72, (STA) (2) 73, (STA) (3) 74.

In the present embodiment, the slave station (STA) (1) 72 is present in an area in good communication with the master station (AP) 71, and a communication 76 using an encoding ratio with good frequency use efficiency, for example, R=5/6 is performed between the master station (AP) 71 and the slave station (STA) (1) 72. Moreover, the slave station (STA) (2) 73 is present in an area in poorer communication than the slave station (STA) (1) 72, and a communication 78 using, for example, an encoding ratio R=3/4 lower than the encoding ratio R=5/6 is performed between the master station (AP) 71 and the slave station (STA) (2) 73. On the other hand, there is no information communicated between the slave station (STA) (3) 74 and the master station (AP) 71, so that the slave station (STA) (3) 74 is in an idle state 77 and is capable of receiving a common beacon 75 alone.

In such a normal operation state, if the interference signal 79 from another radio system (not shown) is received by an in service monitoring function of the master station (AP) 71, the master station (AP) 71 executes an interference signal detection process. In other words, the master station (AP) 71 changes the encoding ratio R=5/6 used in the communication 76 with the slave station (STA) (1) 72 to an encoding ratio R=1/2 which is a lower encoding ratio but has higher resistance to radio propagation errors, and performs a communication 710 with the slave station (STA) (1) 72. In the same manner, the master station (AP) 71 changes the encoding ratio R=3/4 used in the communication 78 with the slave station (STA) (2) 73 to an encoding ratio R=1/2, which is a lower encoding ratio but has higher resistance to radio propagation errors, and performs a communication 711 with the slave station (STA) (2) 73. Moreover, as the slave station (STA) (3) 74 which had been in the idle state 77 has not been in communication so far, the master station (AP) 71 resumes a communication 712 using, for example, the same transmission scheme (encoding ratio R=1/2) as the beacon 75. After information has thus been securely conveyed to all the slave stations (STA) (1) 72, (STA) (2) 73, (STA) (3) 74, the master station (AP) 71 and the slave stations (STA) (1) 72, (STA) (2) 73, (STA) (3) 74 together carry out a process 713 for moving to a new radio communication channel.

Thus, in the fifth embodiment described above, even when the master station (AP) 71 has detected an interference signal from another radio communication channel during the operation of the radio communication system (wireless LAN), the master station (AP) 71 immediately terminates the use of the current radio communication channel, and conveys (the communications 710, 711, 712) the information necessary for an evasive action to move to another radio communication channel (moving process 713) by use of the encoding ratio having higher resistance to radio propagation errors than the encoding ratio which has so far been used by the slave stations (STA) (1) 72, (STA) (2) 73, (STA) (3) 74. This can make it difficult for radio propagation errors between the master station (AP) 71 and the slave station (STA) (1) 72, (STA) (2) 73, (STA) (3) 74 to be caused, thereby ensuring that the information for the evasive action can be conveyed.

In addition, while three slave stations (STA) (1) 72, (STA) (2) 73, (STA) (3) 74 have been explained as an example in the present embodiment, the present invention is not limited to this. In other words, there is no limit to the number of slave stations (STAs) belonging to a certain master station (AP).

Moreover, in the radio communication system of the present embodiment, the transmission scheme for changing the frequency use efficiency used in the communication between the master station (AP) and the slave stations (STAs) is not limited to the convolution code.

Sixth Embodiment

FIGS. 9A and 9B show one example of an operation in a radio communication system according to a sixth embodiment of the present invention. Explained in the present embodiment is a setting process (flow) in the case where transmission diversity is employed as a transmission scheme used in a communication between a master station (AP) and slave stations (STA). Moreover, FIG. 9A is shown to explain the operation of the radio communication system during a normal operation, that is, before the detection of an interference signal, and FIG. 9B is shown to explain the operation of the radio communication system after the detection of the interference signal.

In addition, the present embodiment shows an example in which a master station (AP) 81 not only controls the setting of a radio communication channel used and the transmission/reception operations of a slave station (STA) 84 but also detects an interference signal (e.g., radar waves) 811 and uses two antennas (ANTa, ANTb) of the master station (AP) 81 in the communication with the slave station (STA) 84. However, the detection of the interference signal and the number of antennas are not limited to this example. Further, although the slave station (STA) 84 is exempted from the mounting of a radar detecting function as described above, it can be configured to be mounted with the radar detecting function. Therefore, the slave station (STA) 84 can be configured so that the interference signal is detected and so that a plurality of antennas are provided in the slave station (STA) 84.

In the present embodiment, as shown in, for example, FIG. 9A, the master station (AP) 81 has a plurality of (in this case, two) antennas ANTa82, ANTb83, and a communication 87 is performed between the master station (AP) 81 and the slave station (STA) 84 located in a communication area 86 using the ANTa82 and an antenna ANT85 of the slave station (STA) 84. Normally, the master station (AP) 81 uses the ANTa82 alone in transmission, and may use not only the antenna ANTa82 but also the antenna ANTb83 in reception (reception diversity).

On the contrary, as shown in, for example, FIG. 9B, when the master station (AP) 81 has detected the interference signal 811, the master station (AP) 81 also uses the antenna ANTb83 in addition to the antenna ANTa82 which has so far been used in the communication 87 with the slave station (STA) 84 in order to transmit information 817, 818 on the move to a new radio communication channel toward the antenna 85 of the slave station (STA) 84. At this point, the information 817, 818 is transmitted from the antenna ANTa82 and the antenna ANTb83 using the same transmission scheme with low frequency use efficiency.

Thus, in the sixth embodiment described above, even when the master station (AP) 81 has detected the interference signal 811 from another radio communication system (not shown) during the operation of the radio communication system (wireless LAN), the master station (AP) 81 immediately terminates the use of the current radio communication channel, and communicates the information 817, 818 necessary for an evasive action to move to another radio communication channel not only using the antenna ANTa82 which has so far been used in the communication with the slave station (STA) 84 but also using the antenna ANTb83. Thus, it is possible to obtain transmission diversity effects and to set a transmission scheme with high resistance to radio propagation errors. This can make it difficult for radio propagation errors between the master station (AP) 81 and the slave station (STA) 84 to be caused, thereby ensuring that the information 817, 818 for the evasive action can be transmitted to the slave station (STA) 84. In other words, the same information is transmitted from a plurality of transmission antennas, thereby providing a transmission scheme with frequency use efficiency apparently lower than that of a multi input multi output (MIMO) technique in which a plurality of kinds of different information are transmitted from a plurality of transmission antennas.

Moreover, while two antennas ANTa82, ANTb83 of the master station (AP) 81 are used to perform a communication with one slave station (STA) 84 in the example described in the present embodiment, the present invention is not limited to this. In other words, there is no limit to the number of slave stations (STAs) belonging to a certain master station (AP) 81 and no limit to the number of transmission antennas provided in the master station (AP).

Seventh Embodiment

Figure 10:
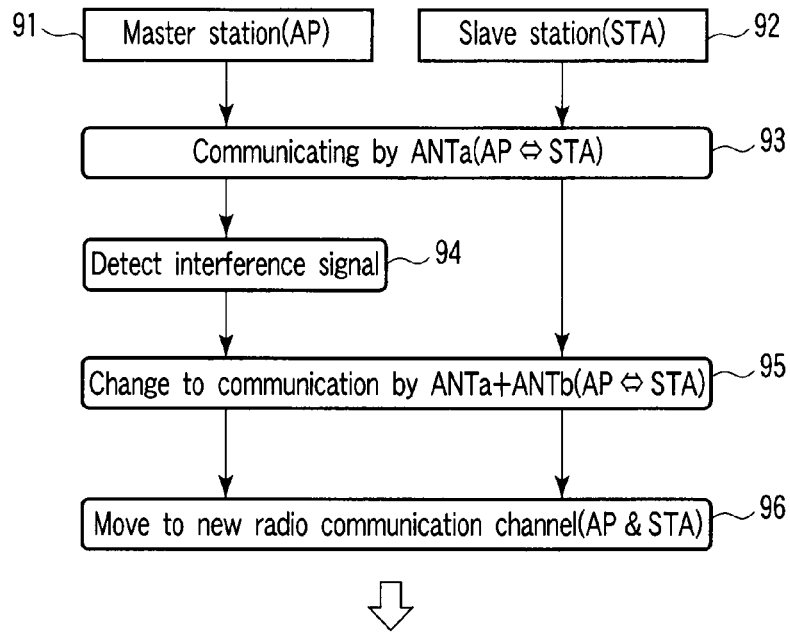
FIG. 10 is a diagram shown to explain an operation for setting a scheme of transmission between a master station and a slave station in a radio communication system according to a seventh embodiment of the present invention.

FIG. 10 shows one example of an operation in a radio communication system according to a seventh embodiment of the present invention. Explained in the present embodiment is a setting process (flow) in the case where transmission space diversity with frequency use efficiency lower than transmission diversity is employed as a transmission scheme used in a communication between a master station (AP) and a slave station (STA).

In addition, the present embodiment shows an example in which a master station (AP) 91 not only controls the setting of a radio communication channel used and the transmission/reception operations of a slave station (STA) 92 but also detects an interference signal (e.g., radar waves) 94 and uses two antennas (ANTa, ANTb) of the master station (AP) 91 in the communication with the slave station (STA) 92. However, the detection of the interference signal and the number of antennas are not limited to this example. Further, although the slave station (STA) 92 is exempted from the mounting of a radar detecting function as described above, it can be configured to be mounted with the radar detecting function. Therefore, the slave station (STA) 92 can be configured so that the interference signal is detected and so that a plurality of antennas are provided in the slave station (STA) 92.

As shown in FIG. 10, the master station (AP) 91 performs a communication 93 with the slave station (STA) 92 using the antenna ANTa before the detection of an interference signal. On receipt of the interference signal 94, the master station (AP) 91 starts an interference signal detection process, and changes the setting to transmit the same information 95 not only using the antenna ANTa which has so far been used but also using the antenna ANTb. This ensures that the information 95 can be conveyed to the slave station (STA) 92, such that the master station (AP) 91 and the slave station (STA) 92 together carry out a process 96 for moving to a new radio communication channel.

Thus, in the seventh embodiment described above, when the master station (AP) 91 has detected an interference signal from another radio communication system (not shown) during the operation of the radio communication system (wireless LAN), the master station (AP) 91 immediately terminates the use of the current radio communication channel, and communicates the information 95 necessary for an evasive action to move to another radio communication channel not only using the antenna ANTa which has so far been used in the communication with the slave station (STA) 92 but also using the antenna ANTb. Thus, it is possible to obtain transmission space diversity effects and to set a transmission scheme with high resistance to radio propagation errors. This can make it difficult for radio propagation errors between the master station (AP) 91 and the slave station (STA) 92 to be caused, thereby ensuring that the information 95 for taking the evasive action can be transmitted to the slave station (STA) 92.

In addition, while two antennas ANTa, ANTb of the master station (AP) 91 are used to perform a communication with one slave station (STA) 92 in the example described in the present embodiment, the present invention is not limited to this. In other words, there is no limit to the number of slave stations (STAs) belonging to a certain master station (AP) and no limit to the number of transmission antennas provided in the master station (AP).

Figure 11A:
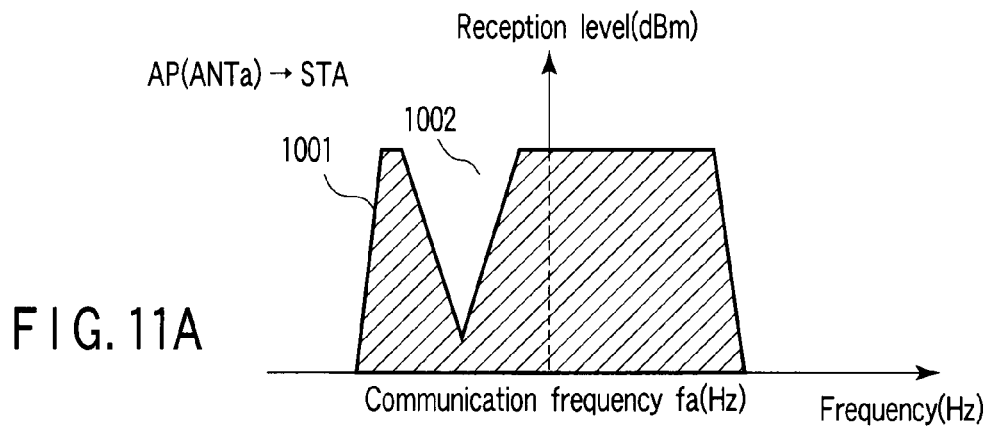
FIGS. 11A to 11C are diagrams shown to explain the effects of transmission diversity in the radio communication system according to the present invention.
Figure 11B:
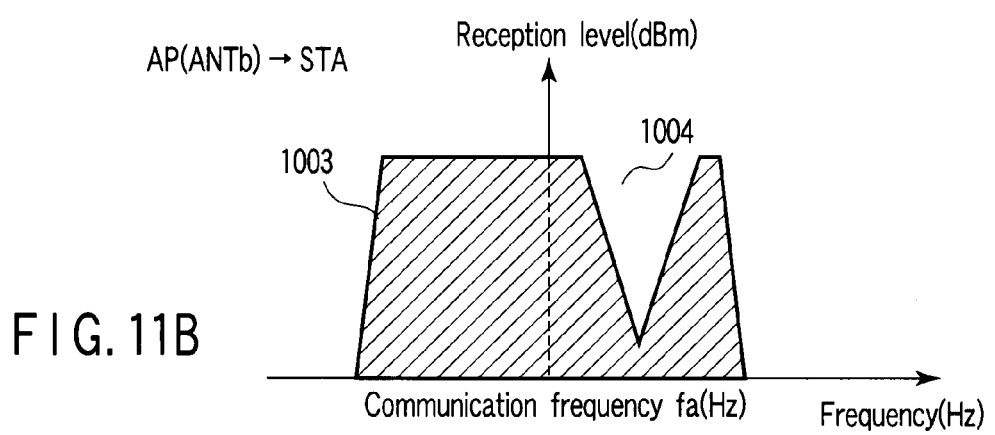
Figure 11C:
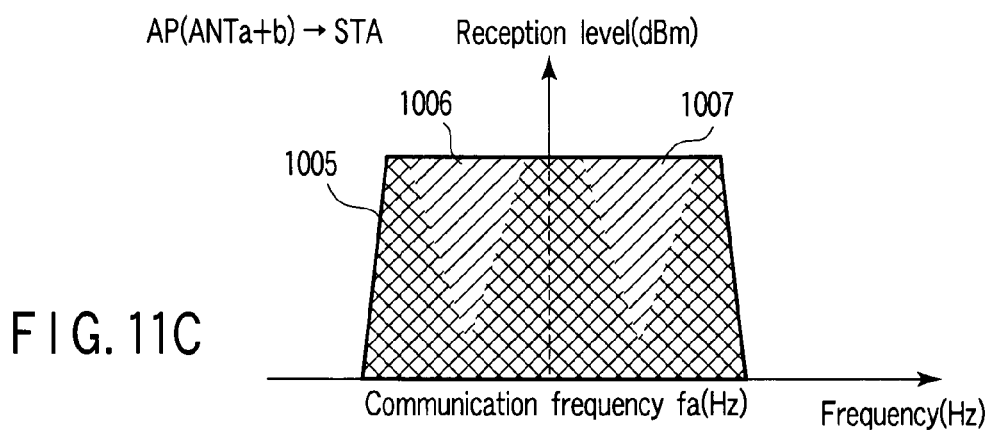

FIGS. 11A to 11C conceptually show the effects of transmission diversity as a transmission scheme used in a communication between the master station (AP) and the slave station (STA), according to the radio communication system of the present invention.

As shown in FIG. 11A, in a propagation path between the antenna ANTa of the master station (AP) and the antenna of the slave station (STA), a distortion determined by the spatial position relation therebetween is caused. Therefore, a frequency selective fading distortion (notch) 1002 is present in a reception signal spectrum 1001 received in the slave station (STA) due to multiple reflection electric wave propagation paths (multipath) whether indoors or outdoors.

Likewise, as shown in FIG. 11B, a frequency selective fading distortion (notch) 1004 is present in a reception signal spectrum 1003 transmitted from the antenna ANTb of the master station (AP) and received by the antenna of the slave station (STA).

As described above, the frequency selective fading distortions (notches) 1002, 1004 are only determined by the spatial position relation between the antennas ANTa, ANTb of the master station (AP) and the antenna of the slave station (STA). Thus, the characteristic between the antenna ANTa of the master station (AP) and the antenna of the slave station (STA) is completely different from the characteristic between the antenna ANTb of the master station (AP) and the antenna of the slave station (STA).

As shown in FIG. 11C, the different frequency selective fading distortions 1002, 1004 are present in the respective different frequency components (the reception signal spectrums 1001, 1003), so that the reception signal spectrums 1001, 1003 transmitted from the plurality of antennas ANTa, ANTb of the master station (AP) and received in the slave station (STA) are synthesized. This makes it possible to complement frequency spectrum information 1006, 1007 lost in the frequency selective fadings. It is thus possible to finally receive a reception signal spectrum 1005 including all the frequency components.

In this manner, a transmission scheme is set which shows less frequency use efficiency but higher radio propagation error resistance than a MIMO scheme capable of transmitting different information from a plurality of antennas. This makes it difficult for radio propagation errors between the master station (AP) and the slave station (STA) to be caused, thereby ensuring that the information for the evasive action can be transmitted to the slave station (STA) even after the master station (AP) has detected the interference signal from another radio communication channel.

Eighth Embodiment

Figure 12:
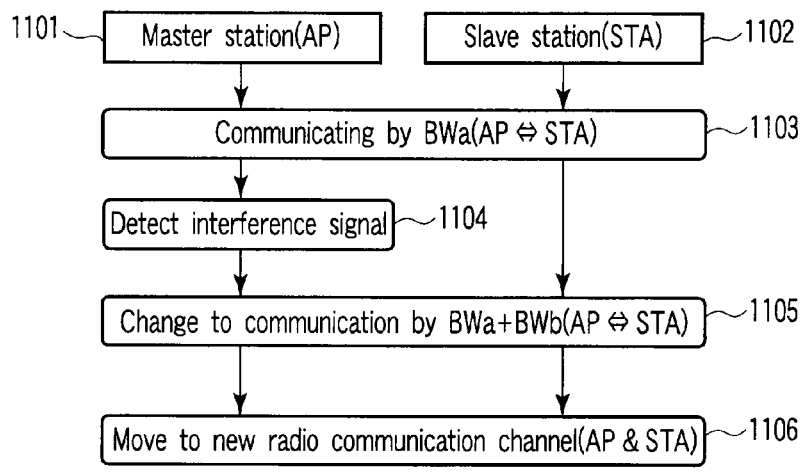
FIG. 12 is a diagram shown to explain an operation for setting a scheme of transmission between a master station and a slave station in a radio communication system according to an eighth embodiment of the present invention.

FIG. 12 shows one example of an operation in a radio communication system according to an eighth embodiment of the present invention. Explained in the present embodiment is a setting process (flow) in the case where frequency diversity is employed as a transmission scheme used in a communication between a master station (AP) and a slave station (STA).

In addition, the present embodiment shows an example in which a master station (AP) 1101 not only controls the setting of a radio communication channel used and the transmission/reception operations of a slave station (STA) 1102 but also detects an interference signal (e.g., radar waves) 1104 and adds a frequency band used in the communication with the slave station (STA) 1102. However, the detection of the interference signal and the addition of the frequency band used are not limited to this example. Further, although the slave station (STA) 1102 is exempted from the mounting of a radar detecting function as described above, it can be configured to be mounted with the radar detecting function. Therefore, the slave station (STA) 1102 can be configured so that the interference signal is detected and so that the frequency band used is added.

As shown in FIG. 12, the master station (AP) 1101 performs a communication 1103 with the slave station (STA) 1102 using a frequency band BWa before the detection of an interference signal. On receipt of the interference signal 1104, the master station (AP) 1101 starts an interference signal detection process, and changes the setting to communicate the same information 1105 not only using the frequency band BWa which has so far been used but also using a frequency band BWb. This ensures that the information 1105 can be conveyed to the slave station (STA) 1102, such that the master station (AP) 1101 and the slave station (STA) 1102 together carry out a process 1106 for moving to a new radio communication channel.

Thus, in the eighth embodiment described above, when the master station (AP) 1101 has detected an interference signal from another radio communication system (not shown) during the operation of the radio communication system (wireless LAN), the master station (AP) 1101 immediately terminates the use of the current radio communication channel, and conveys the information 1105 necessary for an evasive action to move to another radio communication channel not only using the frequency band BWa which has so far been used in the communication with the slave station (STA) 1102 but also using the frequency band BWb. Thus, it is possible to obtain frequency diversity effects and to set a transmission scheme with high resistance to radio propagation errors. This can make it difficult for radio propagation errors between the master station (AP) 1101 and the slave station (STA) 1102 to be caused, thereby ensuring that the information 1105 for the evasive action can be transmitted to the slave station (STA) 1102.

In addition, while two frequency bands BWa, BWb are used to perform a communication with one slave station (STA) 92 in the example described in the present embodiment, the present invention is not limited to this. In other words, there is no limit to the number of slave stations (STAs) belonging to a certain master station (AP) and no limit to the number of frequency bands used.

Figure 13A:
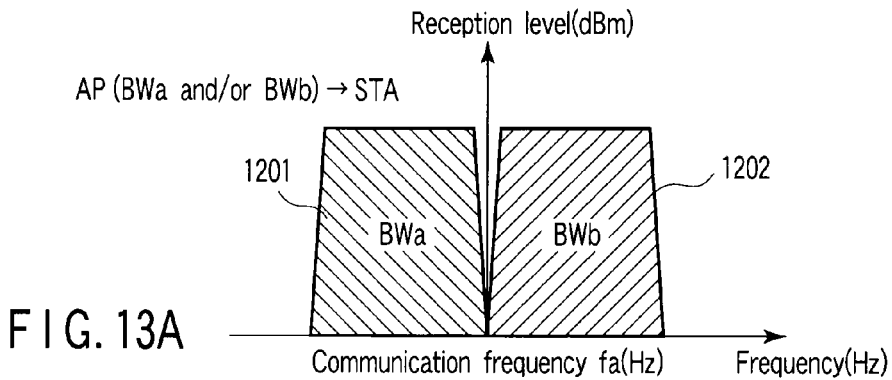
FIGS. 13A and 13B are diagrams shown to explain the effects of transmission diversity in the radio communication system according to the present invention.
Figure 13B:
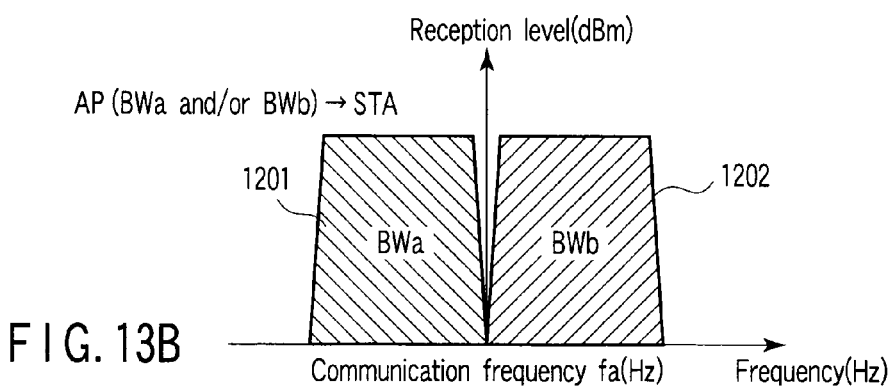

FIGS. 13A and 13B conceptually show the effects of the use of frequency diversity as a transmission scheme used in a communication between the master station (AP) and the slave station (STA), according to the radio communication system of the present invention.

As shown in FIG. 13A, the master station (AP) normally uses a frequency band BWa1201 for the communication between the master station (AP) and the slave station (STA). Otherwise, the master station (AP) uses the frequency band BWa1201 and a frequency band BWa1202, and communicates different information on the frequency band BWa1201 and the frequency band BWa1202.

As shown in FIG. 13B, after the detection of an interference signal, the master station (AP) uses the frequency band BWa1201 and the frequency band BWa1202 BWa1201 for the communication between the master station (AP) and the slave station (STA), and communicates the same information on the frequency band BWa1201 and the frequency band BWa1202.

Although described above, a frequency selective fading distortion is present in radio propagation, and part of the frequency spectrum of the signal received in the slave station (STA) is probabilistically lost. Thus, in order to further ensure the communication between the master station (AP) and the slave station (STA), the same information is communicated by radio using the plurality of frequency bands BWa1201, BWa1202, thereby making it possible to prevent the loss of information.

In this manner, a transmission scheme is set which essentially shows less frequency use efficiency but higher radio propagation error resistance than a transmission scheme capable of transmitting different information by using different frequency bands BWa1201, BWa1202. This makes it difficult for radio propagation errors between the master station (AP) and the slave station (STA) to be caused, thereby ensuring that the information for the evasive action can be conveyed to the slave station (STA) even after the master station (AP) has detected the interference signal from another radio communication channel.

In addition, the frequency band in the present embodiment corresponds to a subcarrier of an orthogonal frequency division multiplexing (OFDM) scheme, and also includes the case where the same information is allocated to a plurality of subcarriers and transmitted thereto.

Ninth Embodiment

Figure 14:
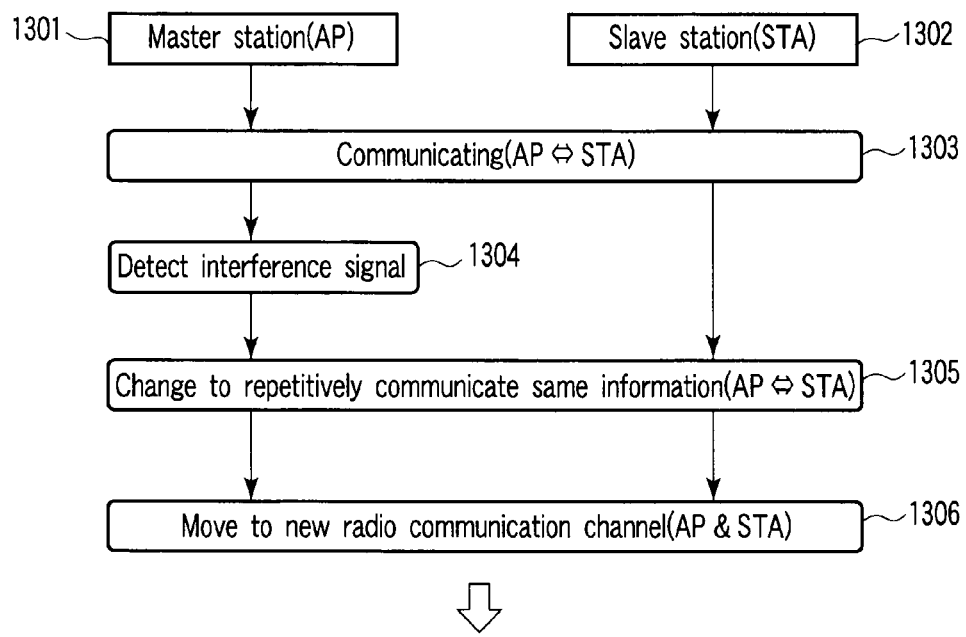
FIG. 14 is a diagram shown to explain an operation for setting a scheme of transmission between a master station and a slave station in a radio communication system according to a ninth embodiment of the present invention.

FIG. 14 shows one example of an operation in a radio communication system according to a ninth embodiment of the present invention. Explained in the present embodiment is a setting process (flow) in the case where time diversity is employed as a transmission scheme used in a communication between a master station (AP) and a slave station (STA).

In addition, the present embodiment shows an example in which a master station (AP) 1301 not only controls the setting of a radio communication channel used and the transmission/reception operations of a slave station (STA) 1302 but also detects an interference signal (e.g., radar waves) 1304 and changes the number of transmission of the same information in the communication between the master station (AP) 1301 and the slave station (STA) 1302. However, the detection of the interference signal and the change of the number of transmission of the same information are not limited to this example. Further, although the slave station (STA) 1302 is exempted from the mounting of a radar detecting function as described above, it can be configured to be mounted with the radar detecting function. Therefore, the slave station (STA)

1302 can be configured so that the interference signal is detected and so that the number of transmission of the same information is changed.

As shown in FIG. 14, the master station (AP) 1301 performs a communication 1303 with the slave station (STA) 1302 in accordance with the setting which allows one kind of information to be transmitted only once, before the detection of an interference signal. Naturally, in the case of information requiring the confirmation of delivery, retransmission is repeated until the delivery is confirmed within the limit of the number of retransmissions.

However, as report information, for example, is simultaneously transmitted to a plurality of slave stations (STAs), the master station (AP) cannot individually confirm the delivery. Thus, a slave station (STA) which has caused a radio propagation error remains out of the report information. Moreover, the occurrence of the radio propagation error is variable over time, and even if the radio propagation error occurs at a certain time in a certain slave station, it may not occur at a different time.

Thus, when detecting the interference signal 1304, the master station (AP) 1301 starts an interference signal detection process, and changes the setting to repetitively transmit the same information 1305 a plurality of times instead of the number of information transmission which has been set to "1" so far. This ensures that the information 1305 can be conveyed to the slave station (STA) 1302, such that the master station (AP) 1301 and the slave station (STA) 1302 together carry out a process 1306 for moving to a new radio communication channel.

Thus, in the ninth embodiment described above, when the master station (AP) 1301 has detected an interference signal from another radio communication system (not shown) during the operation of the radio communication system (wireless LAN), the master station (AP) 1301 immediately terminates the use of the current radio communication channel, and repetitively transmits the information 1305 necessary for an evasive action to move to another radio communication channel. Thus, it is possible to obtain time diversity effects and to set a transmission scheme with high resistance to radio propagation errors. This can make it difficult for radio propagation errors between the master station (AP) 1301 and the slave station (STA) 1302 to be caused, thereby ensuring that the information 1305 for taking the evasive action can be transmitted to the slave station (STA) 1302.

In addition, while the same information is repetitively transmitted to one slave station (STA) 1302 in the example described in the present embodiment, the present invention is not limited to this. In other words, there is no limit to the number of slave stations (STAs) belonging to a certain master station (AP) and no limit to the number of repeated transmissions.

FIG. 15 conceptually shows the effects of using the time diversity as a transmission scheme used in a communication between a master station (AP) and a slave station (STA), according to the radio communication system of the present invention.

As shown in FIG. 15, a master station (AP) 1401 is usually set to communicate with a slave station (STA) 1402 only once. For example, one transmission 1410 of a beacon (BC (TX)) from the master station (AP) 1401 and one reception 1411 of a beacon (BC(RX)) by the slave station (STA) 1402 are set. One transmission 1412 of information from the master station (AP) 1401 and one reception 1413 of the information by the slave station (STA) 1402 are also set. Naturally, regarding a transmission 1414 of information and a reception 1415 of the information for the confirmation of delivery, communications may be repeated between the master station (AP) 1401 and the slave station (STA) 1402 until the delivery is confirmed within the limit of the number of retransmissions.

Now, after the detection of an interference signal, a reception 1417 of information in response to a transmission 1416 of the information from the master station (AP) 1401 to the slave station (STA) 1402 fails, and there are no transmission 1418 of information and no reception thereof for the confirmation of delivery, in which case a retransmission 1420 and reception 1421 of the same information and a transmission 1422 and a reception 1423 of information for the confirmation of its delivery are performed as described above. In addition, since there is a possibility that a reception 1425 in response to a transmission 1424 of report information for which the delivery cannot be configured has failed in the slave station (STA) 1402, a retransmission 1426 of the same information is performed, thereby enabling a reception 1427 in the slave station (STA) 1402.

Thus, although the frequency use efficiency decreases, a transmission scheme with high resistance to the radio propagation errors is set owing to the effects of the time diversity in the communication between the master station (AP) 1401 and the slave station (STA) 1402. This makes it difficult for radio propagation errors between the master station (AP) 1401 and the slave station (STA) 1402 to be caused, thereby further ensuring that the information for the evasive action can be transmitted to the slave station (STA) even after the master station (AP) 1401 has detected the interference signal from another radio communication channel.

Tenth Embodiment

FIG. 16 shows one example of an operation in a radio communication system according to a tenth embodiment of the present invention. Explained in the present embodiment is a setting process (flow) in the case where a modulation scheme and the encoding ratio of error correction (convolution code) are employed as a transmission scheme used in a communication between a master station (AP) and slave stations (STAs).

In addition, the present embodiment shows an example in which a master station (AP) 1501 not only controls the setting of a radio communication channel used and the transmission/reception operations of slave stations (STAs) 1502, 1503, 1504 but also detects an interference signal (e.g., radar waves) 1509 and changes a modulation scheme and an error correction scheme (encoding ratio) used in the communications with the slave stations (STAs) 1502, 1503, 1504. However, the detection of the interference signal and the change of the modulation scheme and the error correction scheme (encoding ratio) are not limited to this example. Moreover, although the slave stations (STAs) 1502, 1503, 1504 are exempted from the mounting of a radar detecting function as described above, they can be configured to be mounted with the radar detecting function. Therefore, one or all of the slave stations (STAs) 1502, 1503, 1504 can be configured so that the interference signal is detected and so that the modulation scheme and the error correction scheme (encoding ratio) used in the communications are changed.

For example, each of the slave stations (STA) (1) 1502, (STA) (2) 1503, (STA) (3) 1504 is set in a state capable of communicating with the master station (AP) 1501. In other words, the slave stations (STA) (1) 1502, (STA) (2) 1503, (STA) (3) 1504 belong to the master station (AP) 1501, and a common beacon 1505 from the master station (AP) 1501 is transmitted after modulated by BPSK and encoded at an encoding ratio R=1/2 simultaneously to all the slave stations (STA) (1) 1502, (STA) (2) 1503, (STA) (3) 1504.

In the present embodiment, the slave station (STA) (1) 1502 is present in an area in good communication with the master station (AP) 1501, and a communication 1506 using a modulation scheme such as 64QAM with high frequency use efficiency and using an encoding ratio R=3/4 is performed between the master station (AP) 1501 and the slave station (STA) (1) 1502. Moreover, the slave station (STA) (2) 1503 is present in an area in poorer communication than the slave station (STA) (1) 1502, and a communication 1508 using a modulation scheme 16QAM and an encoding ratio R=2/3 which are lower in frequency use efficiency than 64QAM and R=3/4 is performed between the master station (AP) 1501 and the slave station (STA) (2) 1503. On the other hand, there is no information communicated between the slave station (STA) (3) 1504 and the master station (AP) 1501, so that the slave station (STA) (3) 1504 is in an idle state 1507 and is capable of receiving a common beacon 1505 alone.

In such a normal operation state, if the interference signal 1509 from another radio system (not shown) is received by an in service monitoring function of the master station (AP) 1501, the master station (AP) 1501 executes an interference signal detection process. In other words, the master station (AP) 1501 changes the modulation scheme 64QAM and the encoding ratio R=3/4 used in the communication 1506 between the master station (AP) 1501 and the slave station (STA) (1) 1502 to a modulation scheme 16QAM and an encoding ratio R=1/2 which are lower in the frequency use efficiency, and performs a communication 1510 with the slave station (STA) (1) 1502. In the same manner, the master station (AP) 1501 changes the modulation scheme 16QAM and the encoding ratio R=2/3 used in the communication 1508 with the slave station (STA) (2) 1503 to a modulation scheme (QPSK) and an encoding ratio R=1/2 which are lower in the frequency use efficiency, and performs a communication 1511 with the slave station (STA) (2) 1503. Moreover, as the slave station (STA) (3) 1504 which had been in the idle state 1507 has not been in communication so far, the master station (AP) 1501 resumes a communication 1512 using, for example, the same modulation scheme BPSK and encoding ratio R=1/2 as the beacon 1505. After information has thus been securely conveyed to all the slave stations (STA) (1) 1502, (STA) (2) 1503, (STA) (3) 1504, the master station (AP) 1501 and the slave stations (STA) (1) 1502, (STA) (2) 1503, (STA) (3) 1504 together carry out a process 1513 for moving to a new radio communication channel.

Thus, in the tenth embodiment described above, even when the master station (AP) 1501 has detected an interference signal from another radio system during the operation of the radio communication system (wireless LAN), the master station (AP) 1501 immediately terminates the use of the current radio communication channel, and conveys (the communications 1510, 1511, 1512) the information necessary for an evasive action to move to another radio communication channel (moving process 1513) by use of a combination of the modulation scheme and the encoding ratio having higher resistance to radio propagation errors than a combination of the modulation scheme and the encoding ratio which has so far been used by the slave stations (STA) (1) 1502, (STA) (2) 1503, (STA) (3) 1504. This can make it difficult for radio propagation errors between the master station (AP) 1501 and the slave station (STA) (1) 1502, (STA) (2) 1503, (STA) (3) 1504 to be caused, thereby ensuring that the information for the evasive action can be conveyed.

In addition, while three slave stations (STA) (1) 1502, (STA) (2) 1503, (STA) (3) 1504 have been explained as an example in the present embodiment, the present invention is not limited to this. In other words, there is no limit to the number of slave stations (STAs) belonging to a certain master station (AP).

Moreover, in the radio communication system of the present embodiment, out of the transmission scheme for changing the frequency use efficiency used in the communication between the master station (AP) and the slave stations (STAs), the error correction scheme is not limited to the convolution code.

Furthermore, while combination of the modulation scheme and the encoding ratio of the error correction has only been described in the present embodiment, the transmission scheme to be changed in the frequency use efficiency can also be a combination of the modulation scheme and, for example, the above-mentioned space transmission diversity, frequency diversity or time diversity.

Eleventh Embodiment

FIG. 17 shows one example of an operation in a radio communication system according to an eleventh embodiment of the present invention. Explained in the present embodiment is a setting process (flow) in the case where the transmission power set in a communication between a master station (AP) and slave stations (STAs) is changed.

In addition, the present embodiment shows an example in which a master station (AP) 1601 not only controls the setting of a radio communication channel used and the transmission/reception operations of slave stations (STAs) 1602, 1603, 1604 but also detects an interference signal (e.g., radar waves) 1609 and changes the transmission power in the communications with the slave stations (STAs) 1602, 1603, 1604. However, the detection of the interference signal and the change of the transmission power are not limited to this example. Moreover, although the slave stations (STAs) 1602, 1603, 1604 are exempted from the mounting of a radar detecting function as described above, they can be configured to be mounted with the radar detecting function. Therefore, one or all of the slave stations (STAs) 1602, 1603, 1604 can be configured so that the interference signal is detected and so that the transmission power is changed.

For example, each of the slave stations (STA) (1) 1602, (STA) (2) 1603, (STA) (3) 1604 is set in a state capable of communicating with the master station (AP) 1601. In other words, the slave stations (STA) (1) 1602, (STA) (2) 1603, (STA) (3) 1604 belong to the master station (AP) 1601, and a common beacon 1605 from the master station (AP) 1601 is transmitted by transmission power A (dBm) simultaneously to all the slave stations (STA) (1) 1602, (STA) (2) 1603, (STA) (3) 1604.

In the present embodiment, the slave station (STA) (1) 1602 is present in an area in good communication with the master station (AP) 1601, that is, in a position close to the master station (AP) 1601, and a communication 1606 is performed by transmission power B (dBm) lower than that of the beacon 1605 between the master station (AP) 1601 and the slave station (STA) (1) 1602. Moreover, the slave station (STA) (2) 1603 is located farther than the slave station (STA) (1) 1602, and a communication 1608 is performed by transmission power higher than that in the communication 1606 with the slave station (STA) (1) 1602, for example, transmission power C (dBm) between the master station (AP) 1601 and the slave station (STA) (2) 1603. On the other hand, there is no information communicated between the slave station (STA) (3) 1604 and the master station (AP) 1601, so that the slave station (STA) (3) 1604 is in an idle state 1607 and is capable of receiving the common beacon 1605 alone.

In such a normal operation state, if the interference signal 1609 from another radio system (not shown) is received by an in service monitoring function of the master station (AP) 1601, the master station (AP) 1601 executes an interference signal detection process. In other words, the master station (AP) 1601 changes the transmission power used in the communication 1606 with the slave station (STA) (1) 1602 to the transmission power C (dBm), which is equal to or more than the transmission power B (dBm), and performs a communication 1610 with the slave station (STA) (1) 1602. In the same manner, the master station (AP) 1601 changes the transmission power used in the communication with the slave station (STA) (2) 1603 to the transmission power A (dBm), which is equal to or more than the transmission power C (dBm), and performs a communication 1611 with the slave station (STA) (2) 1603. Moreover, as the slave station (STA) (3) 1604 which had been in the idle state 1607 has not been in communication so far, the master station (AP) 1601 sets the transmission power equal to or more than the transmission power A (dBm) used for the communication of the beacon 1605, for example, sets D (dBm), and resumes a communication 1612. After information has thus been securely conveyed to all the slave stations (STA) (1) 1602, (STA) (2) 1603, (STA) (3) 1604, the master station (AP) 1601 and the slave stations (STA) (1) 1602, (STA) (2) 1603, (STA) (3) 1604 together carry out a process 1613 for moving to a new radio communication channel.

Thus, in the eleventh embodiment described above, even when the master station (AP) 1601 has detected an interference signal from another radio communication system during the operation of the radio communication system (wireless LAN), the master station (AP) 1601 immediately terminates the use of the current radio communication channel, and sets transmission power equal to or more than the transmission power which has so far been used in the communications with the slave stations (STA) (1) 1602, (STA) (2) 1603, (STA) (3) 1604, and then conveys (the communications 1610, 1611, 1612) the information necessary for an evasive action to move to another radio communication channel (moving process 1613). This can make it difficult for radio propagation errors between the master station (AP) 1601 and the slave station (STA) (1) 1602, (STA) (2) 1603, (STA) (3) 1604 to be caused, thereby ensuring that the information for the evasive action can be conveyed.

In addition, while three slave stations (STA) (1) 1602, (STA) (2) 1603, (STA) (3) 1604 have been explained as an example in the present embodiment, the present invention is not limited to this. In other words, there is no limit to the number of slave stations (STAs) belonging to a certain master station (AP).

Moreover, in the present embodiment, the transmission power set after the detection of the interference signal is set to be equal to or more than the transmission power before the detection of the interference signal. However, the present invention is not limited to this. For example, when the transmission power before the detection of the interference signal is already at the maximum value, the operation may be continued with this transmission power (maximum value).

As described above, in the embodiments according to the present invention, when, in a radio communication system comprising one master station (AP) and at least one slave station (STA), the master station (AP) has detected an interference signal from another radio communication system during the operation of a wireless LAN, the master station (AP) immediately terminates the use of the current radio communication channel, and conveys, to each slave station (STA), information necessary for taking an evasive action to move to another radio communication channel by use of a transmission scheme having high resistance to radio propagation errors. This ensures that the master station (AP) can convey the information for taking the evasive action to the slave station (STA).

In other words, in a new frequency band released to meet the needs of the market for wireless LANs, the master station (AP) is obliged to constantly monitor radar waves during operation. When detecting radar waves, it is necessary to ensure that information on, for example, an instruction for the evasive action after the radar detection is conveyed to the slave station (STA). Therefore, according to the embodiments, the information necessary for taking the evasive action can be securely conveyed to the slave station (STA), and it is possible to inhibit the occurrence of a problem such as a sudden forced disconnection of a communication in operation and to avoid disadvantages and inconvenience to a user.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication system comprising:
   one master station which performs transmission without being controlled by another radio station and which is configured to independently set a channel for use in a radio communication; and
   at least one slave station which belongs to the one master station and whose radio communication channel used and transmission/reception operations are controlled by the master station,
   wherein when detecting an interference signal which disturbs the radio communication during operation, the one master station or the at least one slave station sets a first transmission scheme applied to the radio communication to a second transmission scheme lower in frequency use efficiency than the first transmission scheme in order to convey information necessary for an evasive action to move to another radio communication channel.

2. The radio communication system according to claim 1, wherein the second transmission scheme permits a smaller number of information bits to be transmitted per unit time and unit frequency than the first transmission scheme.

3. The radio communication system according to claim 2, wherein the first transmission scheme is 64QAM modulation and the second transmission scheme is 16QAM modulation, or the first transmission scheme is 16QAM modulation and the second transmission scheme is quadrature phase shift keying (QPSK) modulation.

4. The radio communication system according to claim 1, wherein the second transmission scheme is lower in the encoding ratio of error correction than the first transmission scheme.

5. The radio communication system according to claim 4, wherein the encoding ratio of the first transmission scheme is 5/6 or 3/4, and the encoding ratio of the second transmission scheme is 1/2.

6. The radio communication system according to claim 1, wherein the number of transmission antennas for the transmission of the same information is greater in the second transmission scheme than in the first transmission scheme.

7. The radio communication system according to claim 6, wherein the first transmission scheme uses at least a first transmission antenna, and the second transmission scheme uses at least a second transmission antenna including the first transmission antenna.

8. The radio communication system according to claim 1, wherein more frequency components for the transmission of the same information are in the second transmission scheme than in the first transmission scheme.

9. The radio communication system according to claim 8, wherein the first transmission scheme uses at least a first frequency band, and the second transmission scheme uses at least a second frequency band including the first frequency band.

10. The radio communication system according to claim 1, wherein the number of transmissions of the same information is greater in the second transmission scheme than in the first transmission scheme.

11. The radio communication system according to claim 10, wherein the first transmission scheme transmits the same information only once, and the second transmission scheme repetitively transmits the same information.

12. The radio communication system according to claim 1, wherein the second transmission scheme is a combination of some of a transmission scheme using a modulation scheme which permits a small number of information bits to be transmitted per unit time and unit frequency, a transmission scheme in which a lower encoding ratio of error correction is set, a transmission scheme which transmits the same information from a plurality of transmission antennas, a transmission scheme which transmits the same information using a plurality of frequency components, and a transmission scheme which repetitively transmits the same information.

13. The radio communication system according to claim 1, wherein the interference signal is a periodic radio signal.

* * * * *